(12) United States Patent
Li et al.

(10) Patent No.: US 7,788,216 B2
(45) Date of Patent: Aug. 31, 2010

(54) METHOD AND SYSTEM FOR RETRIEVING ADVERTISEMENT INFORMATION

(75) Inventors: Yanhong Li, Beijing (CN); Hongbo Zhu, Beijing (CN); Jianguo Liu, Beijing (CN); Dan Guo, Beijing (CN); Limin Zhou, Beijing (CN); Zhan Wang, Beijing (CN); ZiZheng Liu, Beijing (CN); Jie Yuan, Beijing (CN); Chuang Wang, Beijing (CN); Wenkai Yang, Wuhan (CN)

(73) Assignee: Baidu.com, Inc., Beijing (CN)

( * ) Notice: Subject to any disclaimer, the term of this patent is extended or adjusted under 35 U.S.C. 154(b) by 236 days.

(21) Appl. No.: 11/826,107

(22) Filed: Jul. 12, 2007

(65) Prior Publication Data
US 2008/0172422 A1    Jul. 17, 2008

(30) Foreign Application Priority Data
Jul. 12, 2006   (CN) .................... 2006 1 0098592

(51) Int. Cl.
*G06F 7/00*   (2006.01)
*G06F 17/00*   (2006.01)
*G06F 17/30*   (2006.01)

(52) U.S. Cl. ........................... 707/603; 707/736
(58) Field of Classification Search ............. None
See application file for complete search history.

(56) References Cited

U.S. PATENT DOCUMENTS

| 2004/0030741 | A1* | 2/2004 | Wolton et al. ............... 709/202 |
| 2006/0064411 | A1* | 3/2006 | Gross et al. .................... 707/3 |
| 2006/0074883 | A1* | 4/2006 | Teevan et al. .................. 707/3 |
| 2007/0233375 | A1* | 10/2007 | Garg et al. .................. 701/211 |
| 2007/0260512 | A1* | 11/2007 | Sattley et al. ................. 705/14 |

OTHER PUBLICATIONS

Lieberman et al, "Exploring the Web with reconnaissance agents", ACM Aug. 2001, vol. 44, No. 8, pp. 69-75.*

* cited by examiner

*Primary Examiner*—Uyen T. Le
(74) *Attorney, Agent, or Firm*—McDermott Will & Emery LLP

(57) ABSTRACT

Method and system for retrieving advertisement information. Information characterizing a user's past search behavior is utilized in creating index data that associate individual users to advertisements. When a search request from a user is received, the index data are utilized to identify one or more advertisements with respect to the received user's search request. Such identified advertisements match the user's past search behavior.

56 Claims, 22 Drawing Sheets

METHOD AND SYSTEM FOR RETRIEVING ADVERTISEMENT INFORMATION

BACKGROUND

1. Technical Field

The present teaching relates to the technology of information retrieval and more particularly to a retrieval system and method for advertisement information and applications incorporating the same.

2. Discussion of Related Art

An Internet search engine, as an information service platform, provides search related services to Internet users. In addition, such a search engine also provides advertising services to online advertisers. Advertising services benefit not only advertisers but also Internet search users. Since the beginning of Internet commerce, offering advertisements through a search engine has been an important advertising platform for advertisers and an important information source for online users.

A conventional search engine generally selects, given a search request or query, advertisements based on the current received query. In operation, an Internet user submits a query to a search engine and the search engine usually returns the search results and links to a set of Web pages that are considered most relevant to the query. Upon receiving the results from the search engine, the user can then click on any particular link to visit related Web page. To do online advertising, an advertiser can register a set of search keywords considered to be closely related to an advertisement (which may be a Web page link or enlisted in a pay-for-performance system). If a query submitted by an Internet user contains keyword(s) that matches with the keywords registered with the advertisement, a link pointing to the advertisement enlisted with the search engine may be included in the search results (e.g., appear on a Web page that lists the search result).

There are some problems associated with this conventional approach to identify relevant advertisement. The advertisements included in the search result are selected by matching the keyword(s) as appeared in the query with the keywords associated with individual advertisements. The matching is performed in a strict manner. If there is no keyword, e.g., in the advertisement database, precisely matching with any of the keywords used in a user's query, no advertisements can be identified for the underlying search request and, hence, no advertisement can be presented to the user who initiated the search request.

An improvement has been made in the past for online advertising. With this improvement, the burden of identifying appropriate advertisements is shifted from a search engine to a web site owner. As part of the web page design, a web site owner can arrange to provide link(s) associated with advertisement(s) in his/her web pages and the placement may be made in such a way that the advertisement(s) appearing on each page is considered relating to the content of the web page. In this way, an Internet user can conveniently observe the links to advertisements while browsing the web page. This requires analyzing the text of the web page. In this method, similar problem exists. If a match can not be found between words as appeared on a web page and the keywords used in advertisements, no advertisement link can be provided for this web page.

Some existing systems utilize users' profiles. Such systems analyze data reflecting users' demographics, interests, or preferences and generate corresponding user profiles. For example, for each user, various types of information related to the user may be collected, e.g., gender, age, birthplace, occupation, address, personal interests, hobbies, and other identifiable habits, etc. Such information may be used to characterize various aspects of the user and may be utilized to determine what kinds of advertisements may be of interests to the user. To collect such information, a commonly used data acquisition approach is via a form, online or offline, based on which a user may provide inquired information relating to various aspects of his/her life. After such a form is received, information contained therein may be analyzed to generate a user-profile. Such a profile is static. However, a user's information may change over time. A static user profile created using such snap shot information may not be reflective of the user's current preference or liking and, therefore, is not reliable. In addition, the reliability of the information collected in this way depends on how the forms are designed. Particularly, it is difficult to have a form that includes choices and options that are suitable to all users. As such, it may be the case that such collected information may not accurately reflect each user's profile. Using such inaccurate information to determine how to select relevant advertisement to be presented to each online user likely will yield advertisements that are not suitable to the user.

BRIEF DESCRIPTION OF THE DRAWINGS

The inventions claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

DETAILED DESCRIPTION

Figure 1:
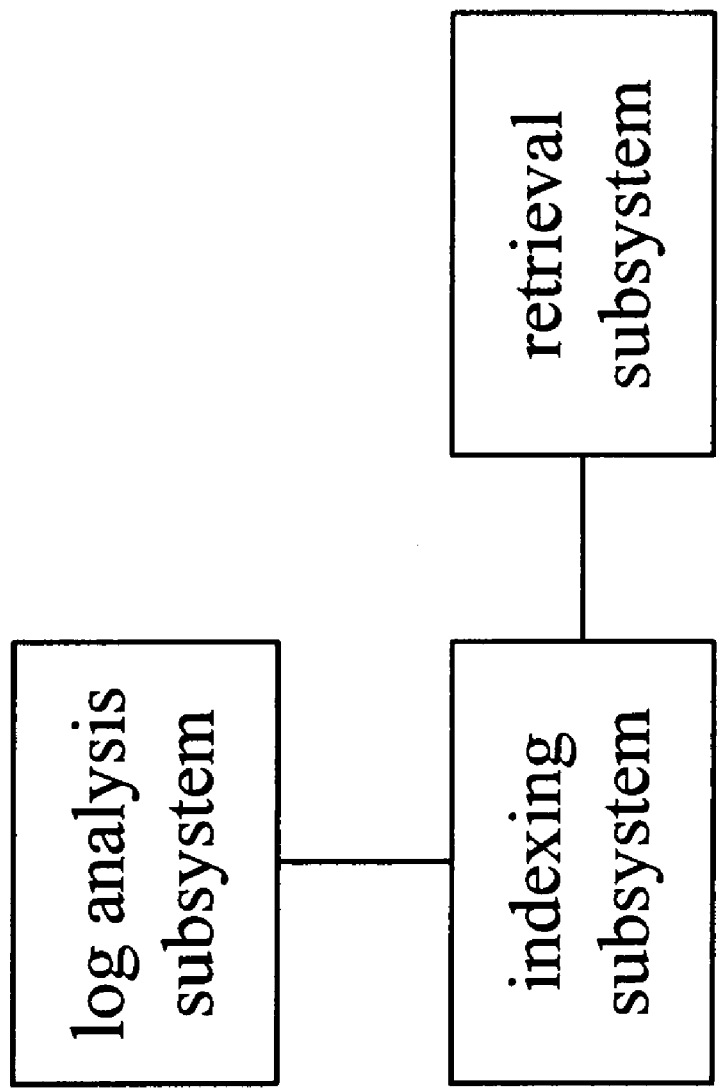
FIG. 1 is a block diagram of system for retrieving advertisement information according to an exemplary embodiment of the present teaching.

The present teaching relates to systems and methods for retrieving advertisement information and application thereof in the context of Internet services. A large-scale Internet search engine usually gathers, while providing services to users, a massive amount of data relating to such users' online behavior such as search activities. A search engine may utilize the collected data to facilitate services other than Internet search and/or enhance the quality of services provided to its customers, including end users who search on the Internet as well as advertisers who wish to effectively advertise their products to the Internet users.

Cookie is a piece of text stored on a user's storage medium by a Web server. A Web server can utilize Cookies to facilitate future operations by subsequently retrieving the piece of text (i.e., the Cookie) saved earlier on a user's computer. For example, a Web server may allocate a unique identification to a user and store that identification as a Cookie on the user's computer. This unique identification can be later used to identify the user's computer or determine appropriate operations to be performed in connection with the user's computer. In general, a unique identification does not have to be a Cookie. However, for the ease of discussion, Cookie is used herein to refer to a unique identifier associated with an Internet user.

When a user conducts an Internet search, one or more search terms are generally supplied to a search engine. Such search terms are part of an Internet query and often termed as "keywords". These keywords are usually used or intended to characterize the subject matter of the content that the user is interested in obtaining from the Internet. For example, if a user desires to know the market price of particular kind of BMW sports cars, the user may use keywords "BMW", "sports car", and "price". An Internet query transmitted using these keywords may likely yield one or more hyper links connectable to web pages sponsored by various BMW dealers.

When a search request is sent from a user computer to a search engine, the search request includes both the query (i.e., the keywords) and the Cookie associated with the user's computer. Search results are obtained and sent back, by the search engine, to the user in the form of, e.g., hyper links as a response to the search request. The search results are sent to the very device where the user's initial search request was made, which is identified via the Cookie sent with the search request.

The retrieval system for advertisement information described herein identifies, for each Internet search request made by a user, advertisement(s) that are considered matching with or suitable to the user and that are selected based on the observed past search behavior. To do so, the advertisement retrieval system, as described herein, creates a log that records Internet searches conducted by an Internet search engine. Based on such log information, past or historical search behavior with respect to each user, as observed during a period of time, can be analyzed, identified, characterized, and recorded with respect to each user identification such as a Cookie.

The past/historical behavior is observed with respect to some aspects of the underlying user. The observation may reflect the user's liking or preference in those aspects of the user's activities. For example, past Internet search activities may provide hint as to the user's hobbies. Patterns of past Internet search activities, e.g., requesting specific types of information during particular hours of the day, may also provide useful information about the user. Those types of information are useful in characterizing the user and can be used to assess what types of products may be of the user's interests and, accordingly, what types of advertisement may be suitable to this particular user.

Certain terms are defined first. An index describing an association between A to B is termed as an A-B index. For example, an index established to associate a Cookie with a keyword is termed as a Cookie-keyword index. An index associating a keyword with an advertisement is termed as a keyword-advertisement index. An index associating an advertisement to a keyword is termed as an advertisement-keyword index. An index associating a Cookie to an advertisement is termed as a Cookie-advertisement index.

An A-B index may be implemented as a pointer, linking A to B. An A-B index may also be implemented as a matrix, with A signifying rows of the matrix and B signifying columns of the matrix. Different values of A represent corresponding rows of the matrix and different values of B represent corresponding columns of the matrix. Each cell of the matrix, which represents a particular A-B index or an instantiation of the A-B index, may record various features associated with the particular instantiation of the A-B index. For example, a weight may be recorded which may have a predetermined meaning, e.g., a weigh factor to be applied to the value of B. As another example, some statistics may be stored in the cell which can be used to derive some measurement such as a probability.

FIG. 1 depicts a block diagram of a system 100 for retrieving advertisement information, according to an embodiment of the present teaching. The system 100 comprises three component systems: a log analysis system, an indexing system, and a retrieval system. Each of these component systems performs certain operations and produces certain results that may subsequently be used by other component system(s). The processing performed by each component system may be carried out at the front end of that system or by a backend processing unit. In addition, similar processing may be carried out by one or more computing devices, which may be located at one or more physical location. That is, each component system or the overall system may be distributed. When in a distributed configuration, the distributed computing devices may connect via network(s) (not shown) and such communications may be conducted in either a synchronous or an asynchronous manner. The network(s) can be a local area network (LAN), a wide area network (WAN), a wireless network, a proprietary network, a virtual network, a public telephone switched network (PTSN), or a combination thereof.

The log analysis system can be configured for recording a visiting log or information relating to users' visits to a search engine. The users' visits may be with respect to Internet search requests. As described herein, each search request includes a user's Cookie information as well as a query comprising one or more keywords. The log analysis system is also configured for analyzing the visiting log to, e.g., derive useful information that characterizes past search behavior with respect to each user. Different types of processing may be performed. For example, the recorded log may be preliminarily processed so that the information recorded is to be organized to facilitate additional analysis, e.g., the log can be sorted with respect to Cookies so that log entries having the same Cookie are stored together. In addition, for entries having the same Cookie, further sorting may be performed such as sorting based on keywords so that it makes it easier to compute how may times this Cookie is associated with a particular keyword.

Other types of analysis may also be performed based on the log information which may be preprocessed, e.g., sorted. For example, statistical analysis may be performed to determine, e.g., frequency of searches with respect to Cookies and term frequency of keywords with respect to Cookies, etc. Such statistics may be used to characterize search behavior of each user corresponding to respective Cookie. In some situations, there may be more than one users for each Cookie (e.g., multiple members of the same household having a family computer identifiable by a Cookie). Advanced analysis such as clustering may be performed on log entries having the same Cookie to obtain statistically distinguishable classes representing individual users of the same Cookie. Such clustering may be based on differences in search behavior recognized from the log information. For example, children in a household may often search for gaming related content, while adults in the same household may search for content with disjoint subject matter. In addition, children may always search during day time (e.g., afternoon between 3:00 pm-5:00 pm) and adults may do so always after 9:00 pm. Based on those statistical differences in search behavior, different users under a same Cookie may be discernable through advanced processing as distinct users even though they have the same Cookie.

The log analysis system collects and analyzes log information. The result from the log analysis system is used by the indexing system for creating information that is useful to facilitate identification of advertisements most suitable to a user. The indexing system is coupled to the log analysis system for generating various indices representing links or associations between users, identified via Cookies (or different users of the same Cookie), keywords, and advertisements.

The indexing system may also be configured for creating indices in the reverse direction (e.g., from advertisements to Cookies or users).

Indices described herein can be created based on information indicative of past/historical behavior associated with each Cookie (or each user under each Cookie), which may be extracted from the recorded log. For example, if a user frequently queries information related to sports cars in recent months (past behavior) as recorded in the log information, it is reasonable to infer that the user has interest in sports cars (preference information). Such identified preference can serve as useful guidance in terms of what types of advertisements may be of interests to the user and, hence, can be used in selecting suitable advertisements to be sent to the user, e.g., while returning query result to the user or in other subsequent services rendered to the user. Advertisements selected using such inferred preference information may have a higher click-through rate or success from advertising business stand point.

Index as described herein are symbolic representation of such guidance information, e.g., that associates a user with some advertisement(s) that are estimated to be of the user's interests. In some embodiments, different indices are established such as Cookie-keyword index, which associates a user's Cookie or identity to one or more keywords as occurred in queries, and keyword-advertisement index, which associates one or more keywords relating to advertisements to advertisements.

To establish such indices, it is assumed that one or more advertisements exist and some textual description of is available. A textual description of an advertisement may be provided by the advertisement itself in terms of words. Such a textual description of an advertisement may also be provided by an advertiser. Some of words in the textual description of an advertisement may be selected as keywords that characterize the underlying advertisement. For example, a video clip of an advertisement for a sports Toyota motorcycle may be characterized using keywords "sports", "Toyota", and "motorcycle". A different advertisement on tickets to Olympic games in year 2008 may be characterized using keywords "sports", "Olympic", and "2008".

Selection of keywords characterizing an advertisement may be made using any methodology known in the relevant art. For example, in the conventional field of advertising, an advertiser may provide a list of keywords for each advertisement to characterize the content. In this case, each keyword provided has certain degree of implication with respect to the advertisement. For example, word "Olympic" has a strong association with an advertisement for the 2008 Olympic Game. However, different keywords associated with the same advertisement may have different degrees of certainty. For example, keyword "sports" my have a lesser degree of certainty as to how this word alone associates with the advertisement for the 2008 Olympic Game. Therefore, even though each advertisement may be characterized by a list of keywords, each such word may not have the same impact on how strongly to associate to the underlying advertisement.

In accordance with the present teaching, the appropriateness (or weight) of a linkage (or index) between a keyword and an advertisement may be evaluated in a variety of ways. For instance, the commonly used measurement "term frequency" of a keyword may be used to assign an initial weight to the linkage. In this case, the less frequently the keyword is used in daily life, the more weight the keyword has in associating with the advertisement. In the above example, word "sports" is a much more commonly used word (therefore, higher term frequency) than word "Olympic". Therefore, in comparison, the word "Olympic" carries more weight in terms of connecting with the advertisement for the 2008 Olympic Game. In other embodiments, an advertiser may provide an initial weight to each keyword indicative of the importance of the word in terms of linking to the advertisement.

On the other hand, such evaluation may vary with respect to individuals. A user may click through, many times, a link for the 2008 Olympic Game advertisement on a search word "sports", such information can be used to determine a higher weight on the connection between word "sports" and the advertisement on 2008 Olympic Game. This weight assignment scheme using click-through rate information relating to the advertisement in connection with a specific keyword is personalized and is performed based on the user's past/historical behavior. Therefore, indices to be created and maintained in accordance with the present teaching correspond to individualized indices, which are used to select, in a personalized manner, advertisements suitable to individual users.

In accordance with the present teaching, an index associating an identifier (e.g., user identifier) with a certain keyword is the Cookie-keyword index. A Cookie-keyword index can be established based on a record of past queries from the user expressed in terms of keywords. Such an index establishes a connection between the identity of the user, e.g., the Cookie, and a keyword considered to be relevant to the user's past/historical behavior. Each Cookie-keyword index may also be evaluated and an appropriate weight may be assigned to each Cookie-keyword index based on the evaluation result. The evaluation may be statistical or based on some other criterion. For example, if most of recent queries corresponding to a particular Cookie contain keyword "furniture", then index "particular Cookie"-"furniture" may be assigned a much higher weigh than weights assigned to other indices having the same "particular Cookie". This may indicate not only that the user identified by Cookie recently has been actively looking for content related to "furniture" (past behavior) but also that this user may have a hobby or daily dealings relating to furniture. That is, a higher weight on a Cookie-keyword index may be indicative of both behavior and preference. Exemplary methods of evaluating each Cookie-keyword index by assigning a weight are discussed below.

Behavior changes over time. In accordance with the present teaching, behavioral changes in a user occurring during a course of time can be reflected in the user's Cookie-keyword indices by dynamically updating the weights associated therewith. Exemplary methods of updating the weights of Cookie-keywords indices are discussed below. In addition to Cookie-keyword index and keyword-advertisement index, the indexing system may create other types of indices. This is discussed below in connection with different embodiments of the present teaching.

Indices created by the indexing system can be utilized by the indexing system in different ways. For example, the Cookie-keyword index can be used in combination with the keyword-advertisement index in order to map from a user's search query associated with a particular Cookie to one or more advertisements that are considered to match with the past behavior or preference of the user. In accordance with the present teaching, the retrieval system is coupled to the log analysis system and the indexing system and configured for identifying, with respect to a search request/query from a user, matching advertisement(s) based on existing Cookie-keyword index data and keyword-advertisement index data. For example, when the advertisement retrieval system 100 receives a search request from a user identifiable via a Cookie, a list of keywords used in the query is also received. Based on the received Cookie and keywords, appropriate Cookie-keyword indices are identified and the weights assigned thereto are determined. A determination of matching advertisements can be made by identifying keyword-advertisement indices using the received list of keywords and their associated weights. Through the identified keyword-advertisement indices, the retrieval system may then select one or more matching advertisements according to certain criteria, which may be based on the dynamically evaluated keyword-advertisement indices. Details related to the retrieval system are discussed below.

Figure 2:
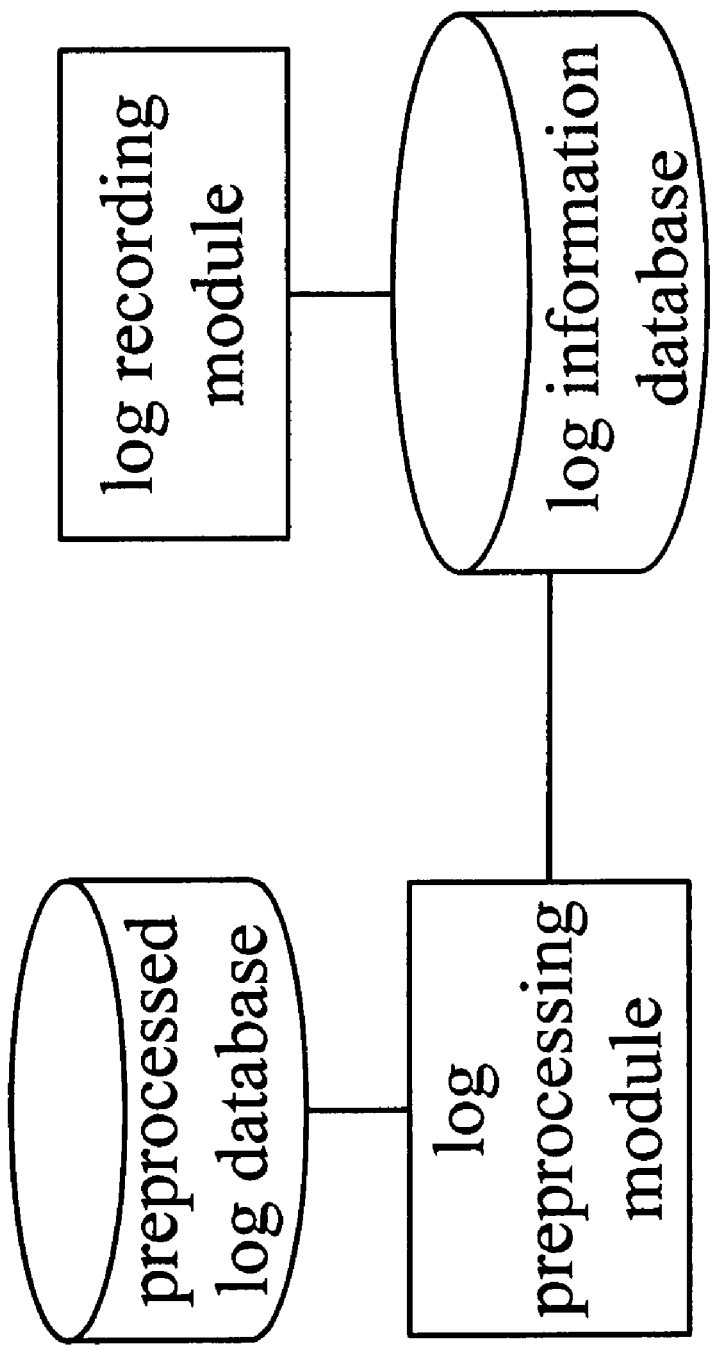
FIG. 2 is a block diagram of a log analysis system according to an exemplary embodiment of the present teaching.

FIG. 2 depicts an exemplary block diagram of the log analysis system according to an embodiment of the present teaching. The log analysis system in FIG. 2 comprises a log information database, a log recording module, a log preprocessing module, and a preprocessed log database. The log recording module receives search requests initiated by users and records the received search requests in the log information base. The log preprocessing module retrieves the log information from the log information database and performs analysis thereof. For example, the log preprocessing module may extract queries, identify query keywords, organize the identified information, and generate the preprocessed log data. Some or all of the preprocessed log data may then be stored in the preprocessed log database. Exemplary types of information stored as preprocessed log data may include Cookies, keywords used in the query, or other symbolic information.

In some embodiments, the log analysis system may comprise duplicated systems for parallel or distributed computing. For example, when a massive amount of log information needs to be recorded and processed due to, e.g., a large number of visitors, information from different sources may be directed to different (duplicated) systems for distributed computing The duplicated systems may physically reside at the same or different locations. Such locations may be strategically chosen based on a variety of considerations. A determination of where to direct each search query may be made based on, e.g., load balancing or geographic distance considerations.

In some embodiments, duplicated systems for log analysis may be divided into multiple groups, each group may include computing devices and components that are adequate for recording and/or analyzing an assigned portion of the log information, e.g., a subset of all Cookies. Each of such groups may be given a distinct IP address, which may be mapped to a same domain name. A determination as to which group a search request or a Cookie is assigned to (for recording and preprocessing) may be made by performing a predetermined operation on the Cookie with respect to the number of groups. The assignment is determined based on the outcome of the operation. For example, a modulo operation may be performed on a Cookie using the number of groups as the modulo factor. Another example is to assign a Cookie to a group in a round Robin fashion. Other alternatives including assigning a Cookie to a particular group based on considerations such as load balancing or geographical distance may also be deployed when appropriate. Information directed to a group or generated by that group may be recorded at locale where the computation device(s) of the group reside. Therefore, such distributed information may be later communicated across different groups in a coordinated fashion so that the overall system has consistent information.

In some embodiments, duplicated systems may also be deployed for fault tolerance purposes. To ensure that the overall system work properly in case of failure on some parts of the system, more than one set of computing devices to perform the same function. In this case, the duplicated systems may be configured so that one or more groups are designated as the backup of a default operational group. In those situations, all backup sets may be synchronized with the operational set so that when the operational set fails to operate properly, any backup set may be selected to replace the failed set. Similarly, the set selected to replace the failed operational set may be determined based on various considerations such as load balancing or geographical distance.

Figure 3:
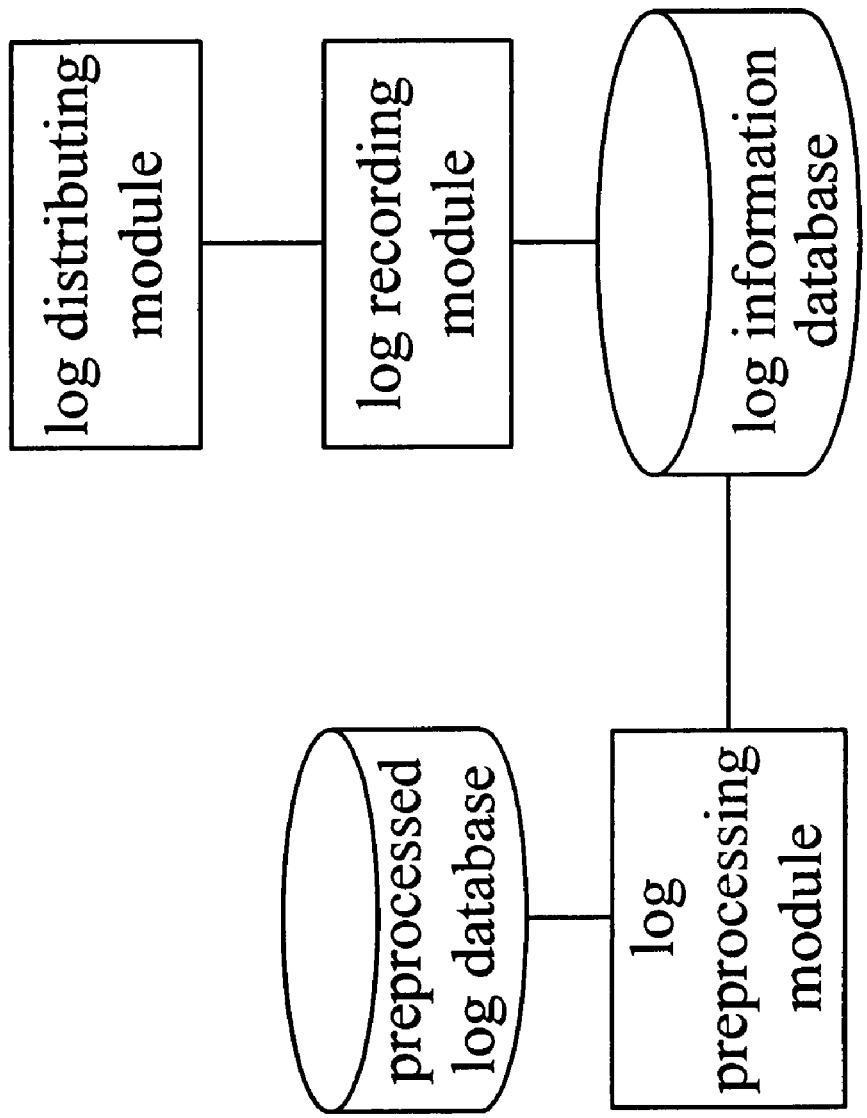
FIG. 3 is a block diagram of a log analysis system according to a different embodiment of the present teaching.

FIG. 3 depicts a block diagram of a log analysis system according to a different embodiment of the present teaching. In this embodiment, the log analysis system has an additional component, a log distributing module. The log distributing module is used for intercepting a search request and transmitting information related to the search request. For example, the log distributing module may direct a search request to a particular log analysis module based on the Cookie information associate with the search request. When distributed log analysis computing devices exist, the log distributing module may independently exist in each log analysis computing device or may be shared. The determination of where to direct a search request may be made in accordance with the considerations described herein.

Figure 4:
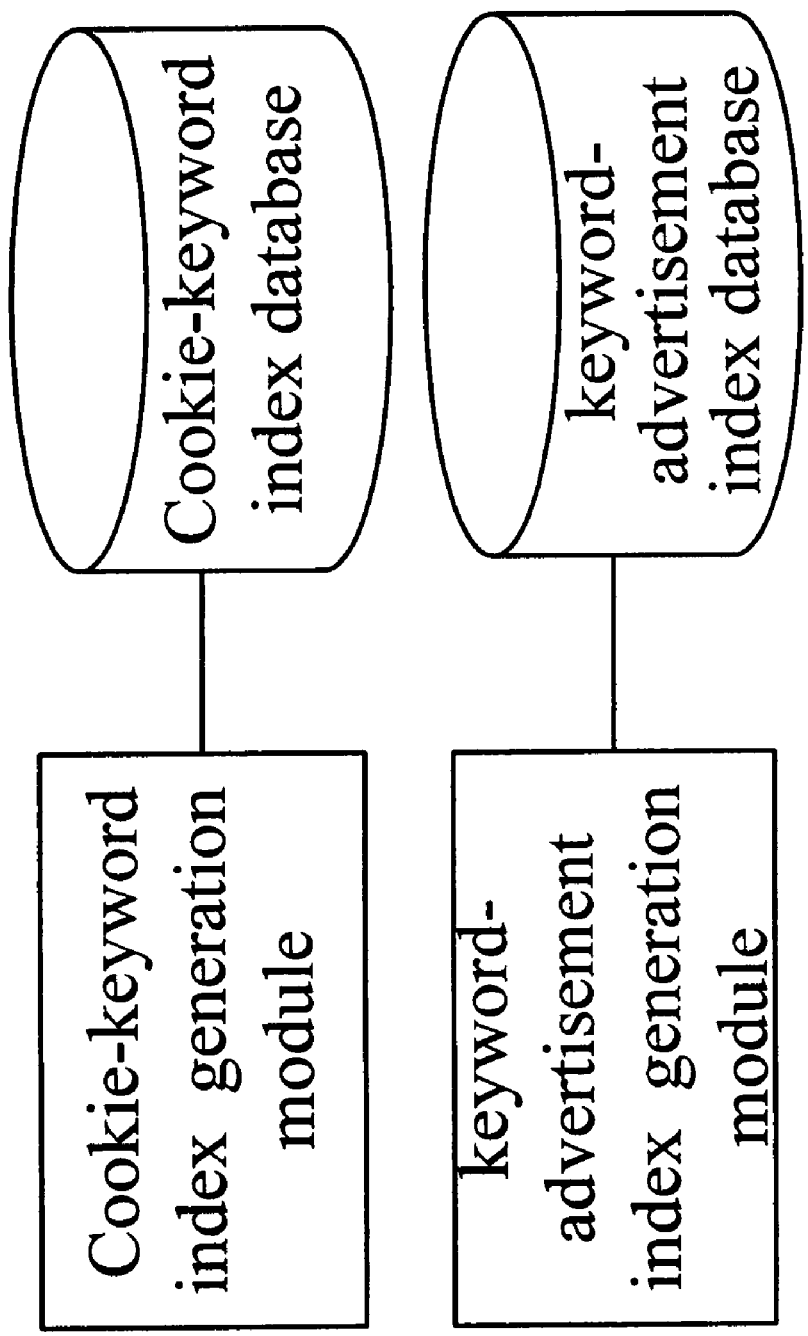
FIG. 4 is a block diagram of an indexing system according to an exemplary embodiment of the present teaching.

FIG. 4 depicts a block diagram of the indexing system according to an embodiment of the present teaching. The indexing system comprises a Cookie-keyword index generation module, a keyword-advertisement index generation module, and corresponding databases that store the indices generated, e.g., a Cookie-keyword index database and a Keyword-advertisement index database. The databases may store index data using a variety of implementations that symbolically represent associations between different types of data. For example, the Cookie-keyword index database may store Cookie-Keyword indices in a matrix, in which each cell symbolically represents the correspondence between a Cookie, identified based on a label of the corresponding row, and a keyword, identified based on a label of the corresponding column. In some embodiments, each index may be represented as qualified. For example, in the above matrix example, each cell representing a Cookie-keyword index may store a weight indicative of the importance of the index. The indices may also be implemented in other forms such as relational databases with a plurality of tables, e.g., a table containing a list of Cookies, a table containing a list of keywords, etc. In this implementation, the cross references between different tables may be used to symbolically define associations, e.g., between Cookies and keywords.

The Cookie-keyword index generation module generates Cookie-keyword indices based on information related to the log, which may include the log itself, preprocessed log, or other information associated with the log. To receive such input, the Cookie-keyword index generation module is coupled to, e.g., the preprocessed log database (not, shown). Upon receiving log related information (as shown in FIG. 4), the Cookie-keyword index generation module generates an increment of Cookie-keyword index data that associate Cookies with keywords and stores the generated indices in the Cookie-keyword index database.

Similarly, the Keyword-advertisement index generation module generates Keyword-advertisement indices based on information related to advertisements, which may include the advertisement itself, descriptions of the advertisement, or other information associated with the log. The Keyword-advertisement index generation module may be coupled to various sources (not shown) in order to obtain information that is necessary to facilitate the generation of keyword-advertisement indices. Upon receiving advertisement related information (as shown in FIG. 4), the Keyword-advertisement index generation module generates Keyword-advertisement index data that associate keywords with advertisements and stores the generated indices in the Keyword-advertisement index database.

In some embodiments, the Keyword-advertisement index data generated by the Keyword-advertisement index generation module represent an increment in time. For example, the weights assigned to different keyword-advertisement indices may change over time. In some embodiments, such updated may be based on the incoming click-through information that reflect the behavior of users as to click which advertisement on which query keywords. Such information is used to modify an existing weight assigned to relevant keyword-advertisement indices. In addition, advertisements may be enlisted based on contractual terms. When the term is up, an index linked to an expired advertisement needs to be updated. The update to the Keyword-advertisement indices may be performed on a regular or dynamic basis, depending on, e.g., the terms of the advertisements or agreed period for running the advertisement according to contractual agreements.

In some embodiments, components needed for generating indices as described herein, including the computational devices as well as storage databases and management thereof, may be replicated for, e.g., distributed computing or fault tolerance. The overall indexing system may be designed as a distributed system configuration under various conditions. For example, when the data volume is relatively high, distributed systems may be deployed so that each system may be responsible for a part of the overall indexing task, e.g., relating to a designated geographical region. With such a system configuration, additional mechanisms may be need to ensure data sharing and coherency. Furthermore, load balancing may also be introduced so that a system located in a low traffic region may be activated to process data volume coming from a high traffic region to reduce the load of that region so that the performance of the overall system can be improved.

In some embodiments, a distributed indexing system may be divided into a plurality of groups, each of which may further include duplicated systems therein for fault tolerance purposes. In this setting, the duplicated systems within each group may serve as backup for each other so that when one fails to operate, a backup can be invoked to seamlessly resume the operation. Such a group with duplicated systems therein may also be configured dynamically to expand the processing capacity. For example, the backup systems may be reconfigured dynamically when the data traffic is high so that all systems can be utilized to operate data processing in parallel as a distributed system. To facilitate the scalability using backup systems, a data transmission module may also be included for distributing data to systems contained in the same group. Correspondingly, a data receiving module may also be employed for data reception. Such a data receiving module may reside within each indexing system. In a distributed system setting, processing tasks can be distributed to selected groups using, e.g., the selection method described herein or any method know in the art.

Indices generated based on log information, e.g., Cookie-keyword indices, may be temporarily stored, upon being generated, as a snap shot or an increment and later be merged with corresponding indices that have been maintained over a longer period of time. In some embodiments, such an arrangement may be made, especially when the indexing system and the retrieval system (discussed below) are separate systems that coordinate operations over a network. In such systems, indices maintained over an extended period of time (history data discussed below) may be stored in a separate (history) database and to ensure speed and quality of advertisement selection, such (history) database may reside in the same system as or in proximity with the system that perform advertisement retrieval. For example, history Cookie-keyword indices may be stored on a computing device on the same system as that for advertisement retrieval.

To avoid frequent and massive data transmission across the network, the newly generated indices may be transmitted and merged into (history) databases occasionally. In some embodiments, Cookie-keyword indices generated based on most recent queries may be treated first as an increment of the overall Cookie-keyword index data. The increment may later be merged with information stored in a corresponding (history) Cookie-keyword database. In some embodiments, the indexing system that generates the increment of indices may operate asynchronously with the retrieval system and the increments may be merged into the corresponding (history) database when it is appropriate. Different operational parameters may be employed to determine the timing for such merge operations. For example, a merge operation can be performed on a regular basis, e.g., daily, every half of a day, every two days, or every week. The merge operation may also be performed on a dynamic basis according to some event, e.g., whenever the network traffic is light and resources for accomplishing the merge operation (e.g., computing power or bandwidth) are available. In some embodiments, a regular schedule may be combined with a dynamic schedule.

Figure 5:
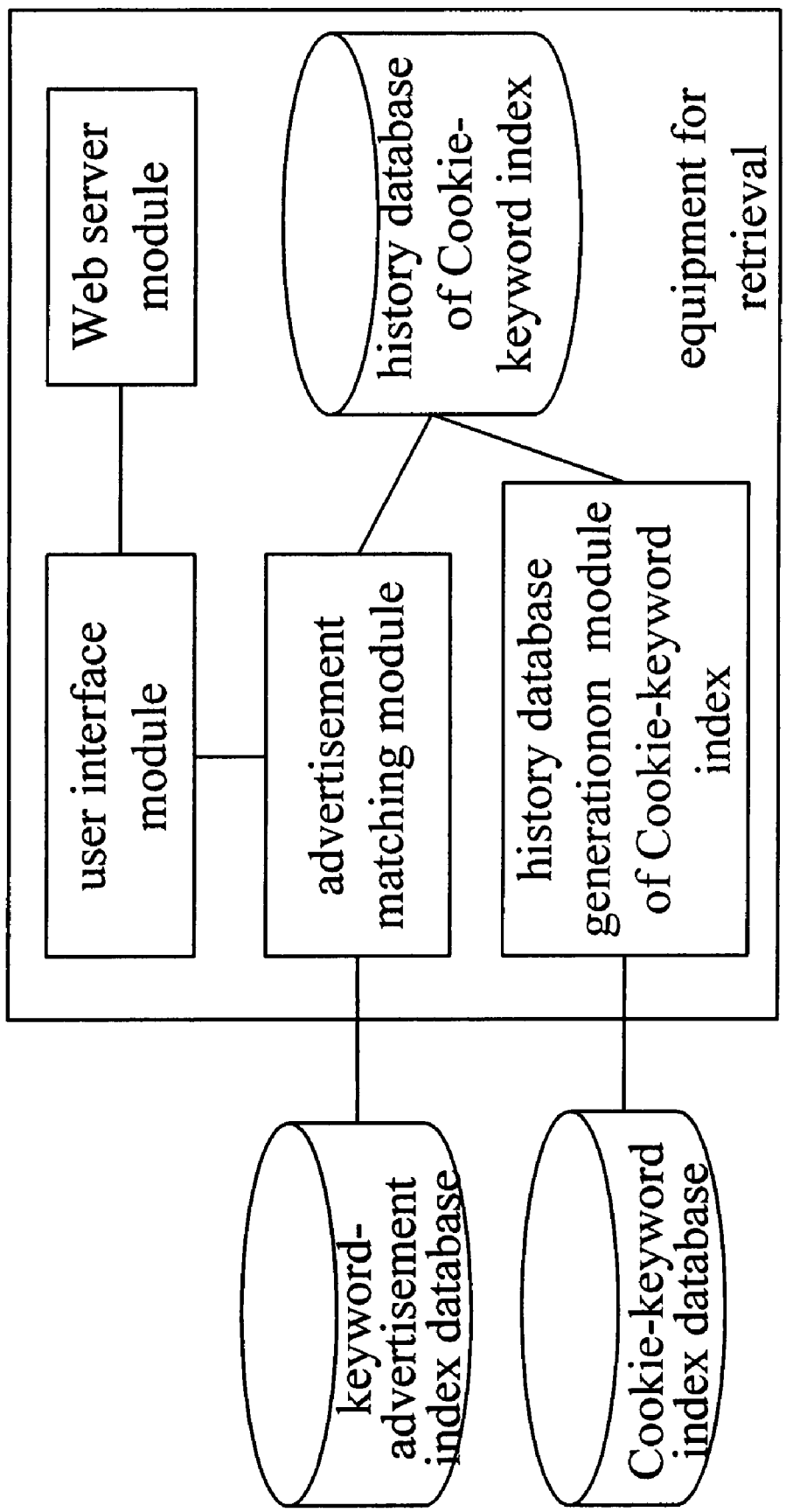
FIG. 5 is a block diagram of a retrieval system for advertisement information according to an embodiment of the present teaching.

FIG. 5 depicts a block diagram of the retrieval system according to an embodiment of the present teaching. The illustrated retrieval system comprises a Web server module, a user interface module, a history Cookie-keyword index database, a history Cookie-keyword index generation module, and an advertisement matching module. The Web server module is used for conducting communications with users via the Internet. The user interface module is coupled with the Web server module for receiving a user's search request transmitted by the Web server module and for returning one or more advertisements that are considered to match with the user's search request to the user's computer.

The history database of Cookie-keyword index stores history data of Cookie-keyword index. The Cookie-keyword index history data generation module is coupled to the Cookie-keyword index database, which may store the increment of Cookie-keyword index, and the history database of Cookie-keyword index. The Cookie-keyword index history data generation module is configured for incorporating the increment of Cookie-keyword index data, generated by the indexing system, in the history database of Cookie-keyword index.

The advertisement matching module is coupled to the history database of Cookie-keyword index data and the keyword-advertisement index database and configured for identifying one or more advertisements that are consider to be most suitable or matched with the Cookie. The advertisement matching module may perform a series of operations to achieve that. For example, the advertisement matching module may, upon receiving a search request containing a Cookie, search the history database of Cookie-keyword index based on the Cookie to locate Cookie-keyword indices that contain the Cookie. Through such identified Cookie-keyword indices, a list of keywords corresponding to the Cookie is obtained. Based on the list of keywords, the advertisement matching module search the keyword-advertisement index database to identify one or more keyword-advertisement indices having keywords matched with what is contained in the list of keywords. Through these keyword-advertisement indices, the advertisement matching module extracts corresponding one or more lists of advertisements. When more than one lists of advertisement are extracted, an appropriate merge operation is performed to derive a single list of non-overlapping advertisements. This non-overlapping list of advertisements is then output to the user interface module as the most suitable or matching advertisements for the Cookie.

In most situations, the increment stored in the Cookie-keyword index database likely is more effective in identifying matching advertisement because the increment reflects the most recent behavior characteristics of users than the history data in the history database of Cookie-keyword index. In some embodiments, in identifying suitable advertisements, the advertisement matching module may instead rely on the increment. In some embodiment the advertisement matching module may consider both the history data and the increment. In those embodiments, the advertisement matching module is coupled to both the Cookie-keyword index database and the history database of the Cookie-keyword index data so that when a Cookie is received, the advertisement matching module conducts a search to both databases to obtain two keyword lists from the respective databases.

Similarly, the retrieval system may be configured as a distributed system with duplicated components distributed according to some criteria. The retrieval system may also be configured to be fault tolerant based on replicated systems. As discussed herein with respect to the log analysis and the indexing system, duplicated systems may also be configured as a plurality of groups of systems, each of which may be responsible for handling advertisement matching for a portion of the overall search requests. In this case, the Web server module may also function as a search request distribution mechanism, transmitting the search requests to various component systems of the distributed overall system. The determination of which request is to be transmitted to which component system may be made based on Cookies in accordance with the methods described herein.

Since a search engine usually handles a huge number of active Cookies at any moment, the indexing system likely becomes the bottleneck of the system. To prevent this situation from occurring, in some embodiments, the log analysis system may also be configured to perform certain processing such as to generate time increment of Cookie-keyword index data and transmit such time increment to the retrieval system. This shifts some of the processing from the indexing system to the log analysis system.

Figure 6:
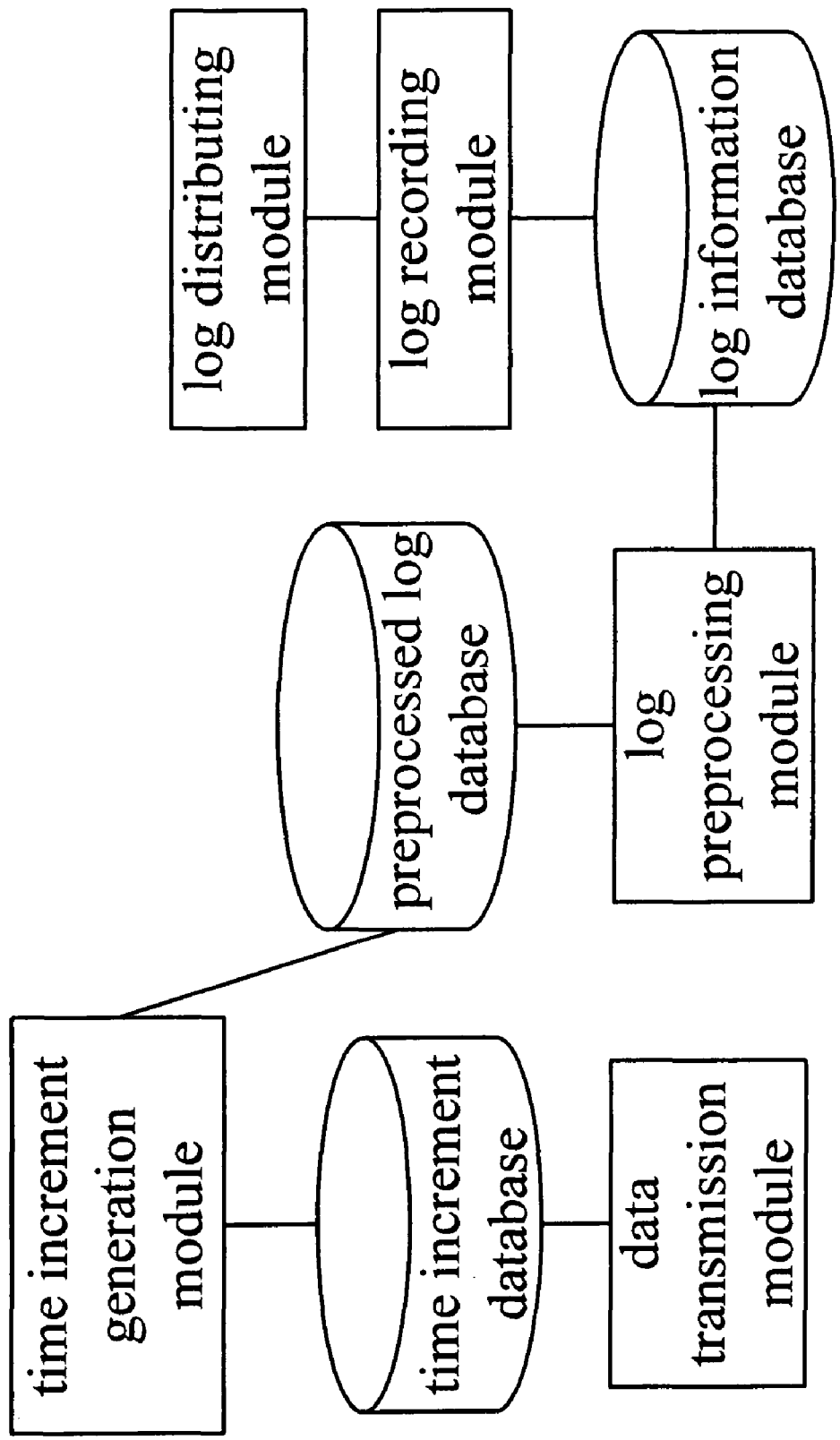
FIG. 6 is a block diagram of a log analysis system according to another embodiment of the present teaching.

FIG. 6 depicts a block diagram of the log analysis system according to yet another embodiment of the present teaching. In this embodiment, the log analysis system additionally includes a time increment generation module, a time increment database, and a data transmission module. The time increment generation module is coupled to the preprocessed log database and configured to retrieve the preprocessed log data and perform processing thereon. For example, the time increment generation module may parse queries into terms, extract keywords, identify Cookie-keyword relationships, and then store the processing results in the time increment database. In some embodiments, the Cookie-keyword relationships stored in the time increment database may be transmitted to the indexing system. In this case, the indexing system does not need to process the preprocessed log information and can utilize the Cookie-keyword relationships directly in deriving the Cookie-keyword indices. In some embodiment, the time increment generation module may perform further operations. For example, the time increment generation module may store the Cookie-keyword relationships in a temporary storage (e.g., memory) and then generate an increment of Cookie-keyword index data based on the relationships cashed in the temporary storage. The generated increment of the Cookie-keyword index data may then be stored in the time increment database and subsequently the data transmission module then sends the increment of Cookie-keyword index data directly to the retrieval system. In this case, the indexing system is relieved from the tasks of generating the increment of Cookie-keyword index data.

Figure 7:
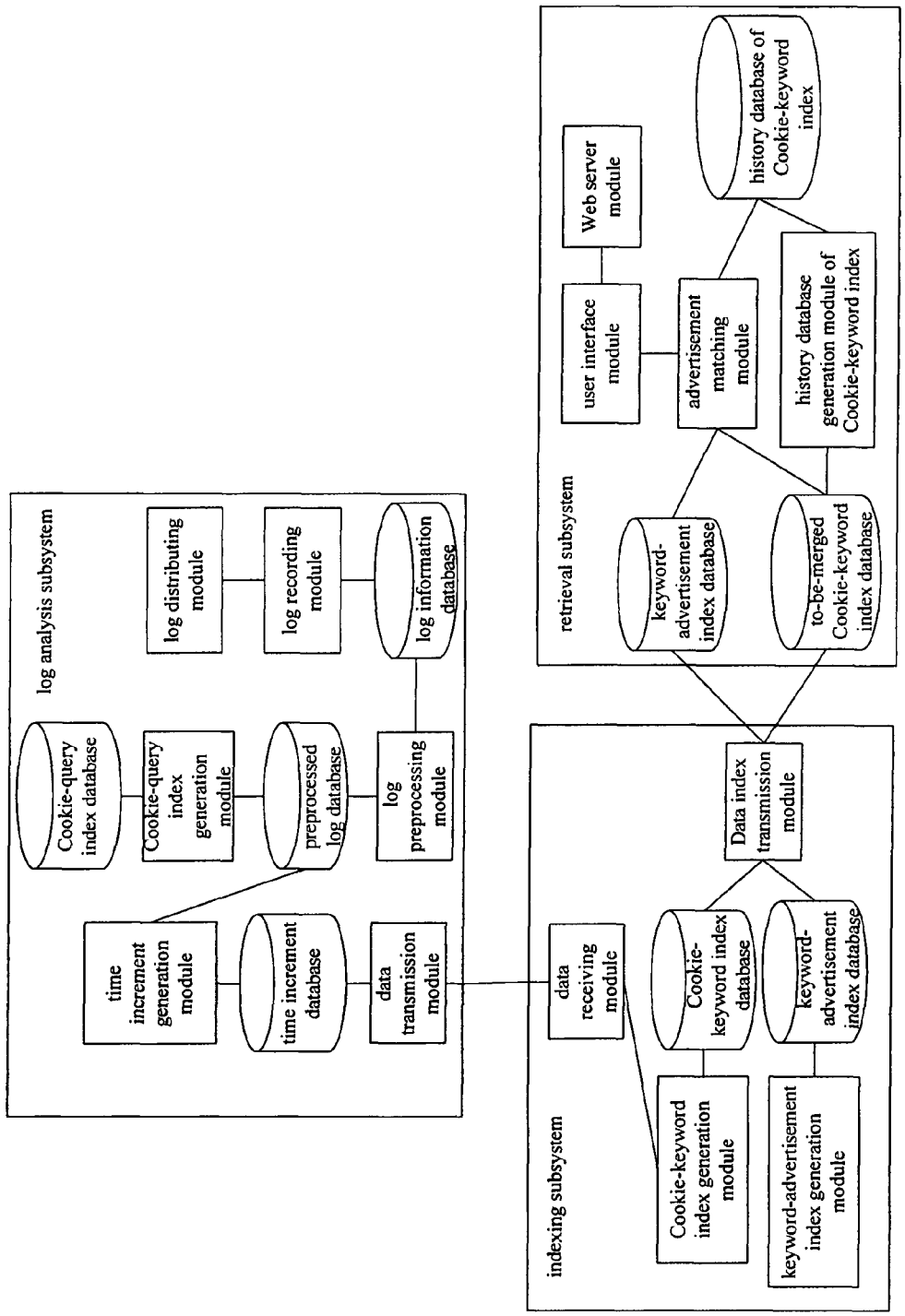
FIG. 7 is a block diagram of a retrieval system for advertisement information according to a different embodiment of the present teaching.

FIG. 7 depicts a block diagram of an advertisement retrieval system for advertisement information according to a different embodiment of the present teaching. The advertisement retrieval system comprises a plurality of component system: a log analysis system, an indexing system, and a retrieval system. The log analysis system further comprises a log distributing module, a log recording module, a log information database, the log preprocessing module, a preprocessed log database, a time increment generation module, a time increment database, and a data transmission module as described above.

In this embodiment of the advertisement retrieval system, the log analysis system further includes a Cookie-query index database and a Cookie-query index generation module. The Cookie-query index generation module is configured for generating Cookie-query indices and storing the generated Cookie-query indices in the Cookie-query index database. Information stored in the Cookie-query index database may be retrieved given Cookies. In addition, the Cookie-query index generation module may be configured to generate preprocessed data, merge preprocessed data, or store preprocessed data according to some preset schedules. For example, the log data may be scheduled to be processed intraday during a time the traffic is low. In some embodiments, query information stored may be required to be kept for a certain period of time for, e.g., security reasons. For example, since in general the volume of Cookie-query index data is relatively small, the Cookie-query index data accumulated in several days can be preserved. With such preserved data, when catastrophic events occurred, e.g., system crash which may cause data being damaged, the preserved Cookie-query index data can be retrieved to recover or repair the damaged Cookie-keyword index. Optionally, the Cookie-query index data stored in the Cookie-query index database can also be retrieved and analyzed for other purposes e.g., to understand users' behavior.

In the system depicted in FIG. 7, to reduce data transmission across network when the retrieval system identifies matching advertisement based on information stored in the keyword-advertisement index database and the Cookie-keyword index database, the increment of Cookie-keyword index data and the keyword-advertisement index data can be stored in the retrieval system so that no data transmission is needed. To facilitate that, the retrieval system in this embodiment additionally includes therein a keyword-advertisement index database and another database called to-be-merged Cookie-keyword index database.

The keyword-advertisement index database in the retrieval system may contain substantially identical information as what is stored in the keyword-advertisement index database in the indexing system. On the other hand, the to-be-merged Cookie-keyword index database is used for storing the increment of Cookie-keyword index data to be merged into the history database of Cookie-keyword index, obtained from, e.g., the indexing system. The history database generation module of Cookie-keyword index is configured to perform the merge operation that incorporates the increment of Cookie-keyword index data stored in the to-be-merged Cookie-keyword index database into the history database of Cookie-keyword index. The merge operation may be performed based on a schedule, which may be static or dynamic. For example, the increment of the Cookie-keyword index data may be merged every day during a low traffic time.

The indexing system as depicted in FIG. 7 comprises similar components as described herein and additionally a receiving module and a data index transmission module. The receiving module communicates with the data transmission module of the log analysis module and is configured to receive time increments of Cookie-keyword index data. The data index transmission module in the indexing system is coupled to the Cookie-keyword index database and the keyword-advertisement index database and configure for transmitting increments of Cookie-keyword index data as well as the keyword-advertisement index data to the retrieval system. The transmission of increments for different index data may be separately scheduled. For example, the keyword-advertisement index data may not need to be updated until the advertisement database is updated.

An increment of Cookie-keyword index data generated based on a preset period of time can be preserved in the indexing system for various reasons. For example, an increment corresponding to Cookie-keyword index data of a period of one day may be preserved so that the history database of Cookie-keyword index can be recovered in case of catastrophic event such as a system crash or data loss. In some embodiments, the increment that is to be merged into the history database of Cookie-keyword index may be preserved in the to-be-merged Cookie-keyword index database. In this case, if the history database for a particular index is to be updated (merged with increment) one time each day, the intraday increment of the index is to be preserved and stored in the to-be-merged Cookie-keyword index database.

Figure 8:
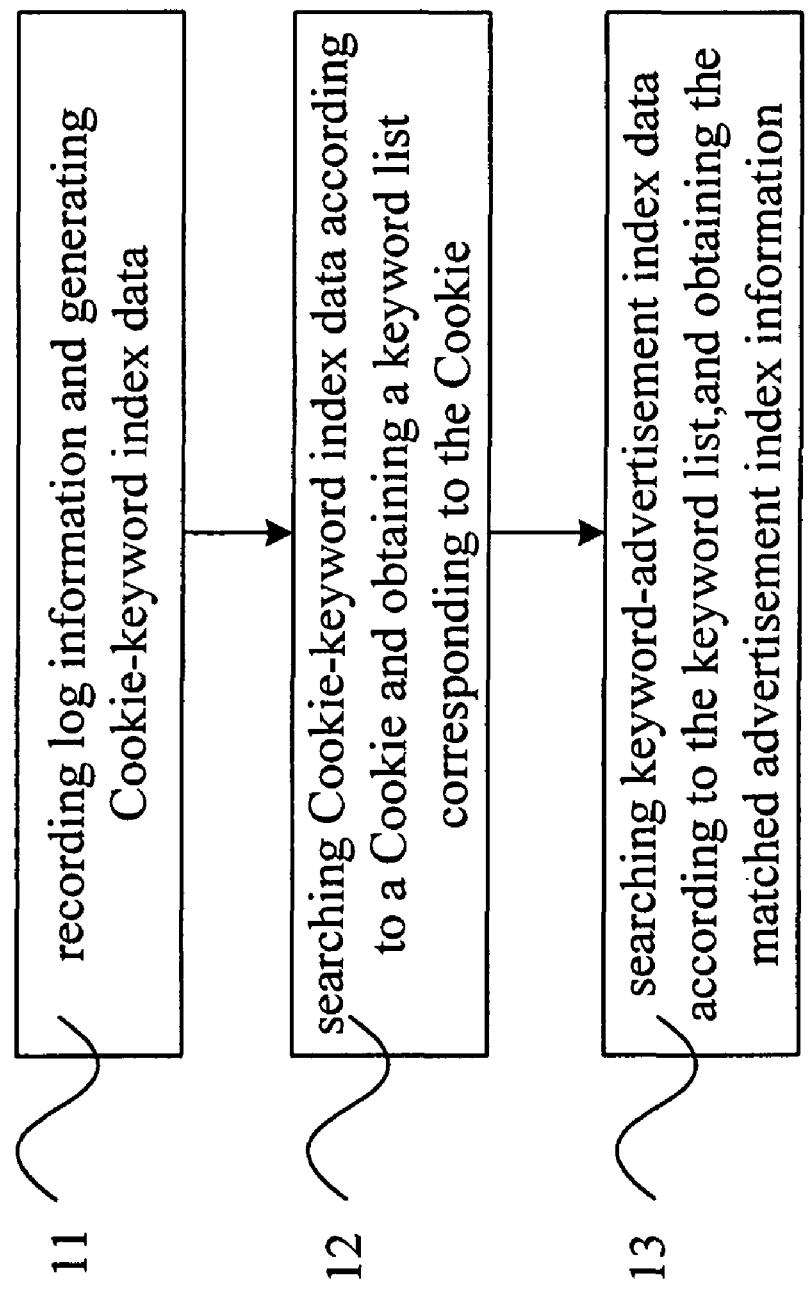
FIG. 8 is a flowchart of an exemplary process in which a retrieval system retrieves advertisement information according to an embodiment of the present teaching.

FIG. 8 is a flowchart of an exemplary process in which a retrieval system retrieves advertisement information according to an embodiment of the present teaching. At step 11, the log information is first recorded and analyzed for generating Cookie-keyword index data. Based on a Cookie contained in a search request, a keyword list corresponding to the Cookie is obtained, at step 12, by searching the Cookie-keyword index data. One or more advertisements that are considered most suitable to the Cookie are then identified, at step 13, by searching the keyword-advertisement index data with respect to each of the keywords contained in the keyword list for the Cookie. When the overall system for retrieving advertisements is distributed, search requests are to be transmitted to appropriate distributed systems according to some predetermined scheme, e.g., according to Cookies.

Figure 9:
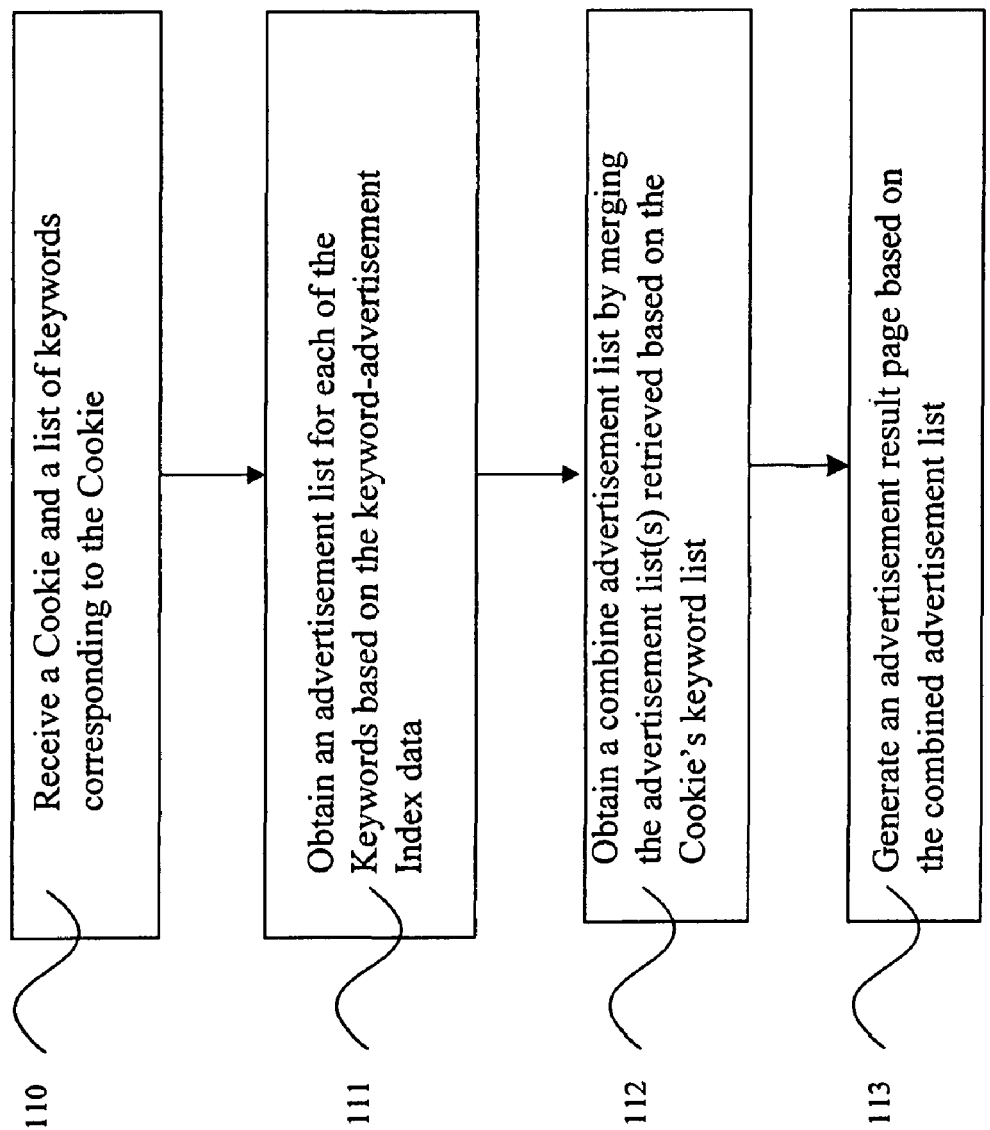
FIG. 9 is a flowchart of an exemplary process in which advertisement information is retrieved via matching according to an embodiment of the present teaching.

FIG. 9 is a flowchart of an exemplary process for a retrieval system that determines advertisements most suitable with respect to a given Cookie according to an embodiment of the present teaching. In this exemplary process, the retrieval system first receives, at step 110, a Cookie and a list of keywords that are specific to the Cookie. For each of the keywords in the received keyword list, the retrieval system searches the keyword-advertisement index data and obtains, at step 111, an advertisement list with respect to that keyword. The result of step 111 is one or more advertisement lists corresponding to the one or more keywords in the received keyword list. The one or more advertisement lists so obtained are then combined, at step 112, to obtain a combined non-overlapping advertisement list. Details related to generating a combined advertisement list are provided with reference to FIG. 12. Based on the combined advertisement list, the retrieval system then generates, at step 113, an advertisement result page.

As discussed herein, to select advertisements that best match with a user behavior to enhance both user's satisfaction and the effectiveness of advertising, a weight may be assigned to each Cookie-keyword index. Such weights may be intended to reflect the user's search behavior and such behavior may vary with time. For example, a user may be interested in a certain subject matter, e.g., sports cars, for one period of time and shifts his/her interests to "Yoga" in a different period of time. Weights assigned to each keyword associated with a particular Cookie may be modified over time to reflect such behavioral changes. As discussed herein, keyword weights are stored with the Cookie-keyword indices in both the Cookie-keyword index database as well as the history database of Cookie-keyword index. In general, keyword weights stored in the Cookie-keyword index database differ in value from the corresponding weights stored in the history database of Cookie-keyword index.

There are various reasons for this difference. For example, a weight value associated with a keyword may be determined based on, e.g., the frequency of the keyword in a particular context, the length of time that the user (corresponding to a Cookie) has been using the keyword, and the time period (past or current) the user is using the keyword in his/her search query, etc. A weight stored in an increment is usually determined in the context of a shorter period of time, e.g., an intraday increment and therefore the weight of a keyword may be determined based on the frequency at which the user uses that keyword in that day. However, the weight assigned to the same keyword in the history database of Cookie-keyword index may be determined not only over a longer period of time but also with consideration as to the time period in which the keyword is associated with a Cookie. For instance, a high frequency may have occurred a long time ago and this may not be that relevant to the weight currently assigned to the keyword. Therefore, it is more sensible to assign a higher weight to a keyword that is frequently used by the user in more recent search queries. In some situations, it may be more effective to utilize the increment, instead of history, or a combination of the increment and the history of the Cookie-keyword indices in connection with searching for the most suitable advertisements to be presented to a user.

When an increment of Cookie-keyword index is merged with the corresponding index stored in the history database for Cookie-keyword index data, the respectively weights associated with the increment Cookie-keyword index and the history Cookie-keyword index also need to be merged. In general, the weight assigned to the increment version may be used to modify the weight assigned to the history version. Since the absolute time period in which a keyword is used at a certain frequency is highly relevant, during merge operation, the weights stored in the history database may first be multiplied by an attenuation factor. With that, if the user does not use the keyword for a substantially long period of time, the weight of the keyword is decayed over time. Such attenuated weights in the history database may then be modified based on the corresponding weights from the increment. Various schemes may be employed to perform the merge operation, including merging the corresponding keyword lists. The merged keyword list in combination with the merged weights characterize the user's historical behavior as a continuum, i.e., in terms of both present time as well as the past time.

As described herein, advertisements matching a user's historical behavior may be identified by searching the Cookie-keyword index data as well as the keyword-advertisement index data. The keyword list obtained from the Cookie-keyword index data for a particular search request may or may not include the keyword(s) used in the current query. In some embodiments, the keyword(s) from a current query may be considered in identifying matching advertisements. There may be different ways to facilitate that. For example, if the increment is used in obtaining keyword list that are subsequently used in determining advertisements, keyword(s) from in the current query may be incorporated into the increment. Alternatively, keywords from the current query may be treated as an independent source of keywords and may be transmitted to the retrieval system in order to be incorporated into the keyword list based on which the matching advertisements are determined. When keyword(s) from the current query are used in identifying matching advertisements, weights may be assigned to such keywords. Weights may be determined based on, e.g., information of keyword attribute etc. Merging keywords from the current query and the weights associated therewith may be performed in a similar manner as merging an increment with the history database.

Figure 10:
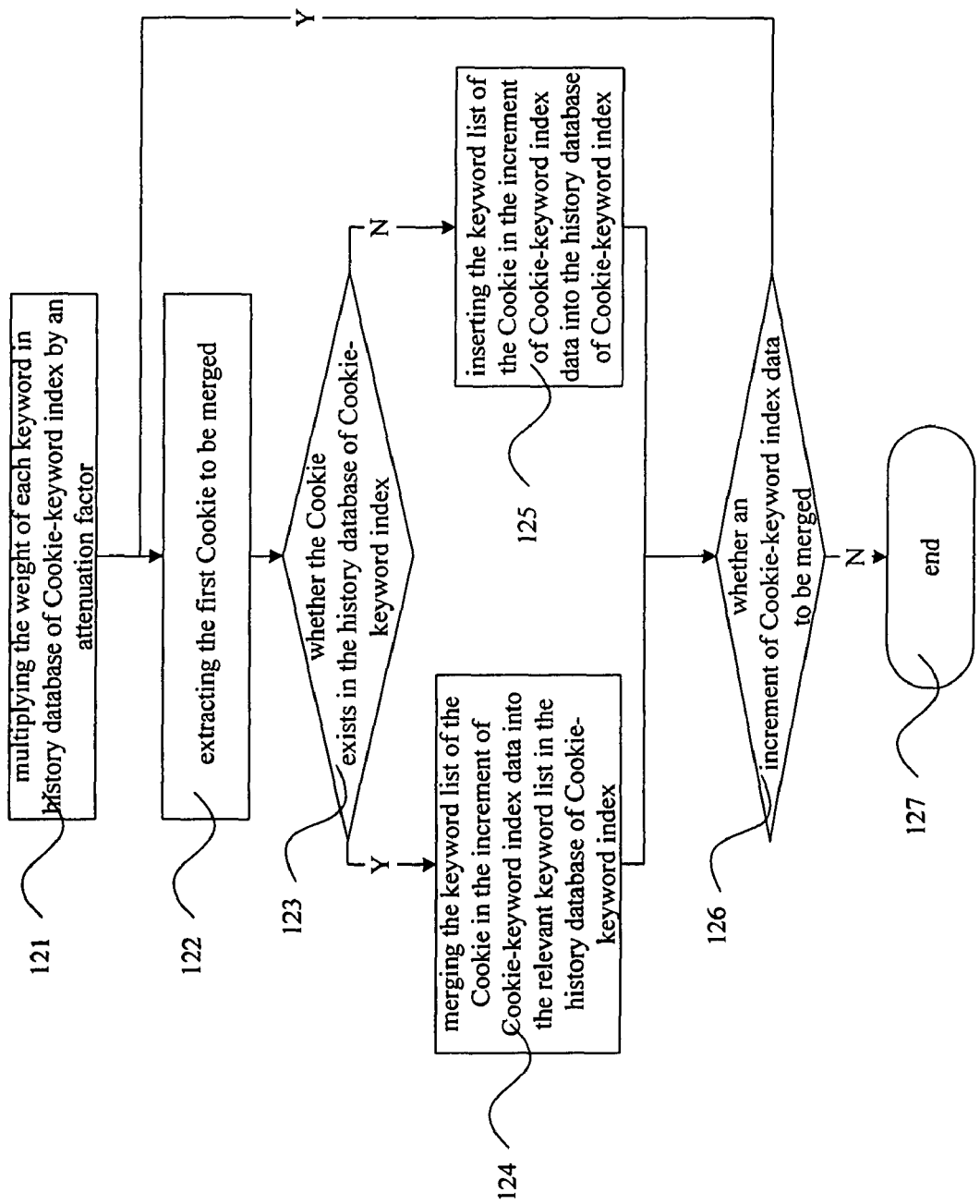
FIG. 10 is a flowchart of an exemplary process in which an increment of Cookie-keyword index data is merged with corresponding Cookie-keyword index data in a history database according to an embodiment of the present teaching.

FIG. 10 is a flowchart of an exemplary process in which an increment of Cookie-keyword index data is merged with corresponding Cookie-keyword index data in a history database according to an embodiment of the present teaching. At step 121, keyword attenuation processing on each keyword in the history database is performed: the weight for each keyword in the history database of Cookie-keyword index data is multiplied by an attenuation factor. To merge the increment of Cookie-keyword index data with the history database, next Cookie in the increment to be merged with the history is extracted at step 122. If it is determined, at step 123, that the Cookie does not exist in the history database of Cookie-keyword index, insert, at step 125, a list of keyword corresponding to the Cookie from the increment into the history database of Cookie-keyword index. If the Cookie already exists in the history database, determined at step 123, the keyword list corresponding to the Cookie from the increment is merged, at step 124, with the corresponding keyword list of the same Cookie in the history database. Details of merging a keyword list from an increment with a keyword list in the history database of Cookie-keyword index are provided with reference to FIG. 11. The process continues until, determined at step 126, each and every Cookie in the increment has been merged into the history database of Cookie-keyword index.

Figure 11:
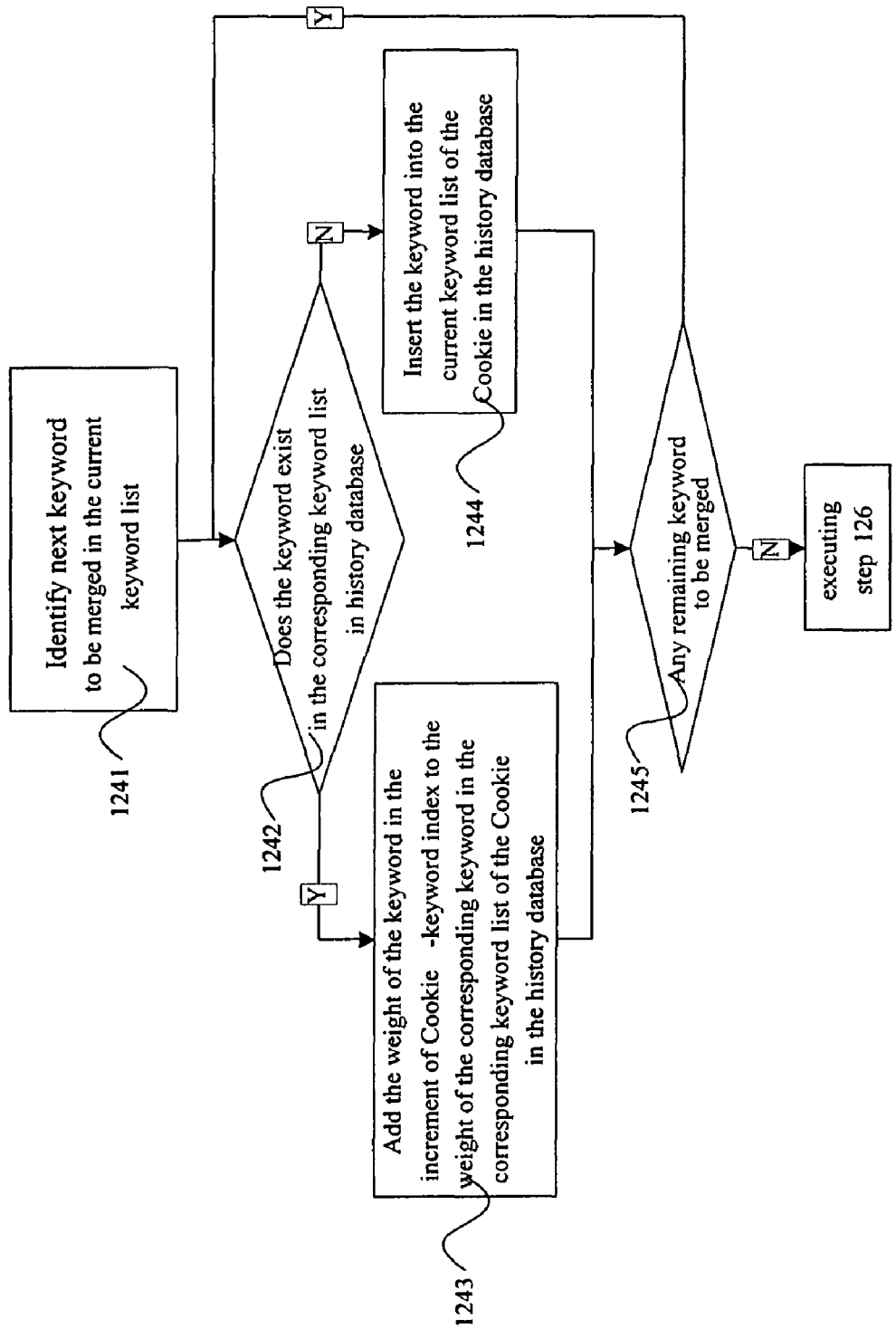
FIG. 11 is a flowchart of an exemplary process in which an increment of keyword list is merged with a corresponding keyword list associated with a Cookie-keyword index in a history database according to an embodiment of the present teaching.

FIG. 11 is a flowchart of an exemplary process in which an increment of keyword list is merged with a corresponding keyword list associated with a Cookie-keyword index in a history database according to an embodiment of the present teaching. First, a keyword to be merged in the keyword list from the increment is identified at step 1241. If the keyword to be merged does not exist in a corresponding keyword list of the same Cookie in the history database of Cookie-keyword index, determined at step 1242, insert the keyword, together with its weights, in the keyword list of the same Cookie from the history database. Otherwise, modify the attenuated weight of the corresponding keyword from the history database by, e.g., adding the weight of the keyword from the increment to the attenuated weight of the keyword from the history database. When there is any remaining keyword to be merged, determined at 1245, the process continues until it traverses each and every keyword contained in the keyword list of the Cookie from the increment. In addition, the merge operation, as illustrated in FIG. 10, continues until all Cookies and their associated keyword lists in the increment are merged.

In some embodiments, indices stored in the history database of Cookie-keyword index data may be purged according to some schedule. Such purge operation may be performed based on some predetermined or dynamically activated criteria. For example, when a weight assigned to a keyword is decayed to reach a level lower than a threshold, the keyword may be purged from the history database. The threshold employed may be predetermined or dynamically updated. A dynamically updated threshold may be set based on, e.g., a need for storage space. For example, when the history database has grown very large so that the operational speed is degraded, there may be a need to do a storage purge operation. Depending on the amount of space the system desires to reclaim, a threshold may be accordingly determined.

A purge operation may also be carried out on a regular basis, which may prevent the history database from growing into a large size. For example, a purge operation may be scheduled every 6 months. In another example, the purge operation may be performed during a merge operation. When an index increment is merged into the history database, the weights of all keywords are evaluated and keywords with a weight less than a preset threshold may be purged. In some embodiments, purge operation with respect to individual keywords or Cookies may be performed whenever a merge operation is performed. When a weight associated with a keyword in the history database is merged with a weight from an increment, if the modified weight is lower than a threshold, the keyword may be removed during the merge operation and, effectively, purged. In some embodiments, the purge operation may also be extended to Cookies. For instance, if all keywords of a Cookie are purged for a certain period of time, which may indicate that the Cookie is no longer in use, the Cookie may be purged from the system.

As illustrated in FIG. 9, each keyword identified given a Cookie may lead to an advertisement list. When a plurality of keywords associated with a Cookie, it yields a plurality of advertisement lists. Multiple advertisement lists need to be merged to produce a combined advertisement list. For non-overlap advertisements, the merge operation is trivial. In this case, the non-overlap advertisement is simply moved to the combined advertisement list with, e.g., its original weight. Different considerations may be applied when an advertisement occurs in more than one list and each occurrence has its own assigned weight. The fact that an advertisement occurs in different lists indicates that there are more than one keyword associated with the Cookie that implicate the advertisement. In this case, the implicated advertisement may reasonably carry a weight that is at least not lower than any single weight assigned to the individual indices where the advertisement occurs. In some embodiments, the combined weight for such an advertisement may be selected to be the maximum of all weights in the individual lists. In some embodiments, a more complex merging scheme may be employed. For example, weights as occurred in individual keyword-advertisement indices may be, e.g., summed or even multiplied, to derive a combined weight assigned to the advertisement in the combined list. Such a sum may be normalized to derive a combined weight. The sum may also be a weighted sum, with each original weight for the keyword-advertisement index being weighed by a weight assigned to the keyword in the Cookie-keyword index. In this manner, the combination is also personalized.

Figure 12:
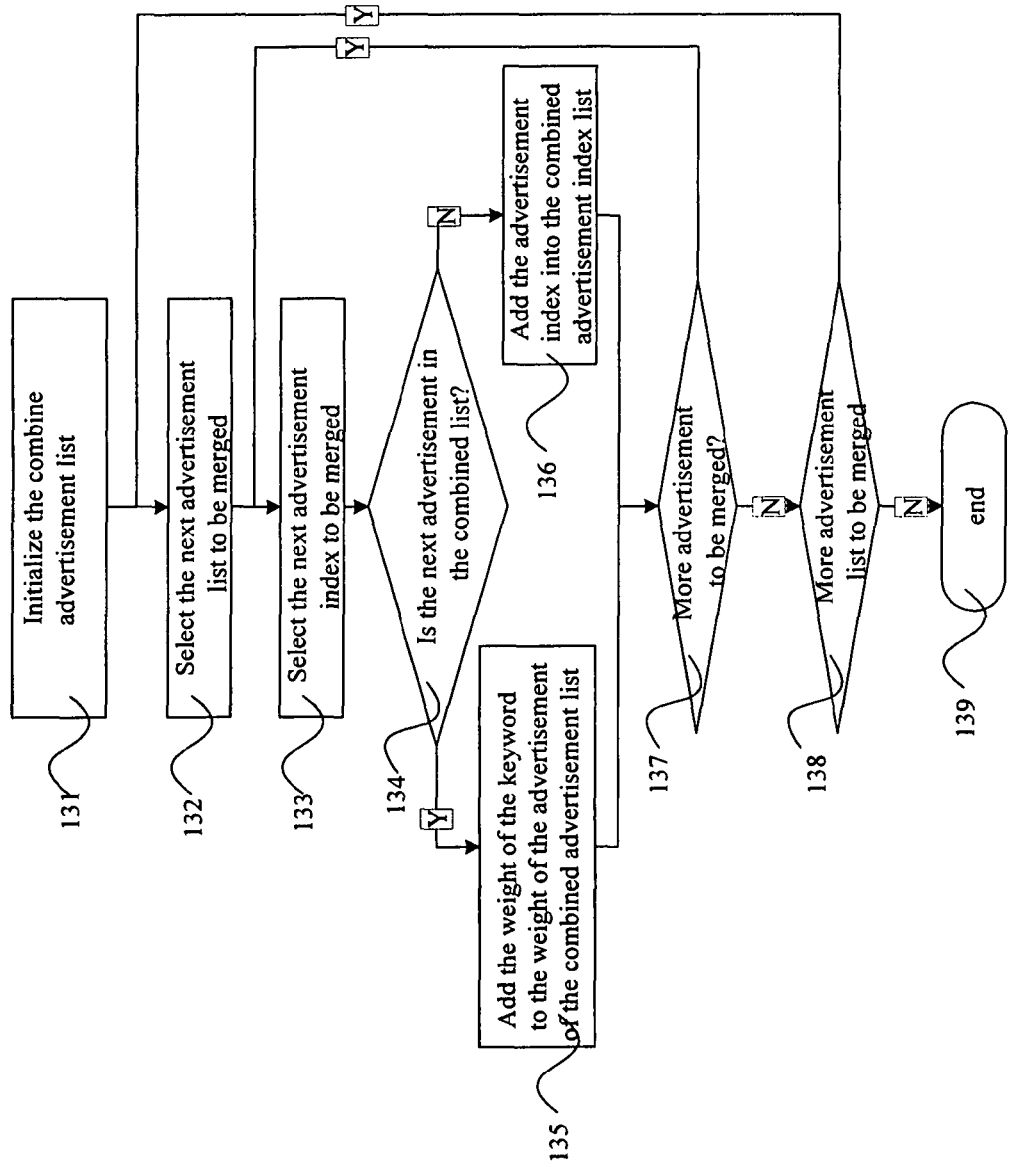
FIG. 12 is a flowchart of an exemplary process for merging an advertisement index list according to an embodiment of the present teaching.

FIG. 12 is a flowchart of an exemplary process for merging multiple advertisement list according to an embodiment of the present teaching. At step 131, initialization of the combined advertisement list and other aspects of the merge operation is performed. The initialization may include creating the combined advertisement list with appropriate data structure for recording processed keyword-advertisement index information and the weight associated therewith and setting the initial status of the combined list. Some peripheral structures may also be created. For example, a label array for recording the labels of processed advertisement indices may be set up, which may also be designed to map each processed advertisement index to a location of the combined advertisement index list where the processed advertisement index is incorporated.

At step 132, next advertisement list to be merged is identified. In the illustrated embodiment, to merge an advertisement list, each and every advertisement contained in the list is to be merged one by one. At step 133, next advertisement to be merged is identified. If the next advertisement to be merged does not exist in the combined advertisement list, determined at step 134, the advertisement to be merged is added, at step 136, to the combined list, including both the advertisement index itself and the weight associated therewith.

If the advertisement to be merged already exists in the combined list (overlap), determined at step 134, the location of the advertisement in the combined list is identified and the weight to be merged is added, at step 135 of the illustrated embodiment, to the weight of the corresponding advertisement in the combined list. The merge process continues until, determined at steps 137 and 138, every advertisement in every advertisement list has been processed. Upon completion of merging multiple advertisement lists, the resultant combined advertisement list provides all the advertisements that are considered relevant to the Cookie. In some embodiment, the combined advertisement list may be further processed to facilitate selection of a subset of advertisements that are considered to be most suitable to the Cookie. For example, the combined advertisement list may be sorted so that the advertisements contained therein are ordered in terms of the weight values.

In most situations, the number of advertisements that can be posted in a given space on a Web page is fewer than what is contained in the combined advertisement list. For example, a Web page may have a limited real estate allocated for advertisements. In this case, the combined advertisement list may need to be trimmed and the trimming operation may be performed according to some criteria. For example, the combined advertisement list may be trimmed by removing any advertisement having a weight lower than a certain threshold. The combined list may also be trimmed so that there are only a certain number of advertisements, e.g., 10. In this case, the retrieval system may trim the combined advertisement list by retaining the top 10 advertisements that have the highest weights. When the combined advertisement list has been sorted, the trimming operation based on top ranking is trivial.

Similar to the Cookie-keyword indices, both the keywords associated with each advertisement and the weights associated therewith may be updated over time. That is, although keywords associated with each advertisement may be initially provided by, e.g., advertisers or text characterization approaches, such association may be modified based on some evolving criteria such as personalized information associated with a particular Cookie. In addition, the weights associated with keywords in keyword-advertisement indices may also be updated with time. For example, weights of keyword-advertisement indices established for a particular Cookie may be modified based on observations of search behavior associated with the Cookie. That is, the keyword-advertisement indices may also be personalized or individualized and that may further enhance the ability to identify advertisements that are suitable in light of a user's profile, including habits, hobbies, behavior, in a continuous and adaptive manner.

As described herein, in some embodiments, a Cookie-keyword index is established based on a visiting log. As discussed above, this facilitates selecting advertisements that are most suitable to a particular Cookie or user. Different indices may also be established based on the same log information which may benefit different customers of an Internet service provider, e.g., the advertisers. Specifically, in some embodiments, indices in a reverse direction, e.g., keyword-Cookie indices and/or advertisement-keyword indices, may also be established. Such indices enable a reversed association or relationship, e.g., from advertisement to keywords and then from keywords to Cookies and can be used to enhance the ability to target appropriate users (Cookies) for each advertisement. In addition, a direct index, namely advertisement-Cookie index may be created via keyword-Cookie indices to establish a direct association between advertisements and Cookies.

Furthermore, in some embodiments, based on the reversed indices, additional type of index, e.g., Cookie-advertisement indices may be derived by inverting some existing reversed indices. For example, in some embodiments, one may derive Cookie-advertisement indices by inverting the advertisement-Cookie indices. In some embodiments, one may also derive Cookie-advertisement indices by inverting advertisement-keyword indices and keyword-Cookie indices. With such derived Cookie-advertisement indices, the retrieval system can map directly from a Cookie to advertisements that are appropriate to the underlying user. Such direct mapping may also enhance the speed performance in posting matching advertisement on the fly.

The advertisement retrieval system, as illustrated in FIG. 1, may be configured to perform these functionalities. For example, the log analysis system may be configured not only for recording and analyzing a visiting log but also for generating increment of keyword-Cookie index data based on the visiting log. In addition, the indexing system may also be configured for generating the advertisement-keyword index data as well as Cookie-advertisement index data in accordance with the keyword-Cookie index data and advertisement-keyword index data. With these indices available, the retrieval system can be configured for obtaining matching advertisements directly based on a given Cookie by searching the Cookie-advertisement index data. FIGS. 14-22 provide illustrative internal configurations and processes of the log analysis system, the indexing system, and the retrieval system to enable the above discussed functionalities.

Figure 13:
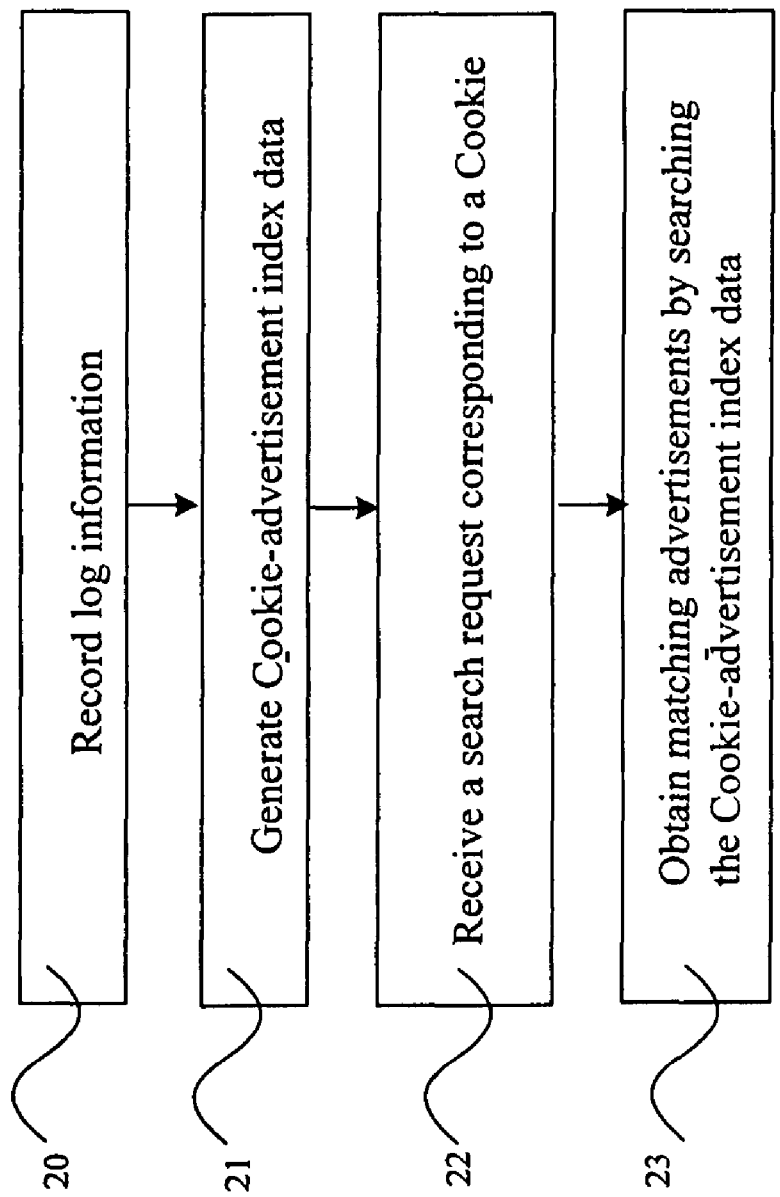
FIG. 13 is a flowchart of an exemplary process for retrieving advertisement information according to an embodiment of the present teaching.

FIG. 13 is a flowchart of an exemplary process for retrieving advertisement information according to an embodiment of the present teaching. Log information associated with Internet search is recorded first at step 20. Cookie-advertisement index data are then generated at step 21. When the system receives, at step 22, a search request associated with a Cookie, the system obtains, at step 23, a list of matching advertisement by searching the Cookie-advertisement index data.

Figure 14:
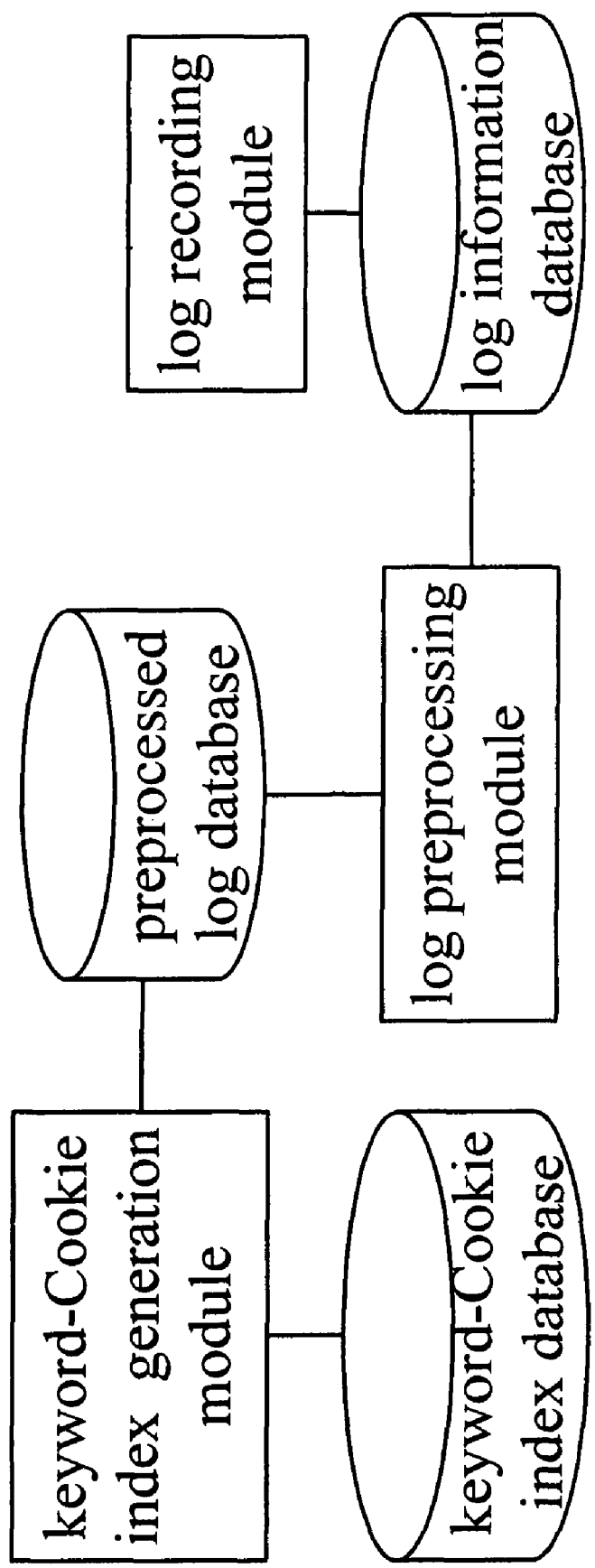
FIG. 14 is a block diagram of a log analysis system according to another different embodiment of the present teaching.

FIG. 14 depicts a block diagram of a log analysis system according to another different embodiment of the present teaching. The log analysis system as illustrated in FIG. 14 comprises a log information database, a log recording module, a preprocessed log database, a log preprocessing module, a keyword-Cookie index database and a keyword-Cookie index generation module. The functionalities of the log information database, the log recording module, the preprocessed log database, and the log preprocessing module are similar to that of the same components as discussed in reference to FIG. 2. The keyword-Cookie index database is configured for storing keyword-Cookie index data. The keyword-Cookie index generation module is coupled to the preprocessed log database and the keyword-Cookie index database for generating an increment of keyword-Cookie index data according to the preprocessed log information and storing the increment of keyword-Cookie index data into the keyword-Cookie index database.

When the log analysis system is a distributed system, the overall log analysis system may be divided into a plurality of groups and the log analysis tasks may be distributed according to different schemes as applications require, as discussed herein. For example, based on a Cookie received, the log analysis system may select a group to transmit the search request for log analysis according to the received Cookie. In some embodiments, the log analysis system, as illustrated in FIG. 14, may include a log distributing module for receiving search requests, transmitting search requests to the corresponding log recording module based on Cookies in the search requests.

The keyword-Cookie index generation module may be configured for segmenting queries into terms, extracting keywords, and generating an increment of the keyword-Cookie index. The keyword-Cookie index generation module may be configured to establish a keyword dictionary and a Cookie dictionary, and perform operations to properly allocate the space of storing the attributes of Cookies and keyword-Cookie index and to maintain such data.

Figure 15:
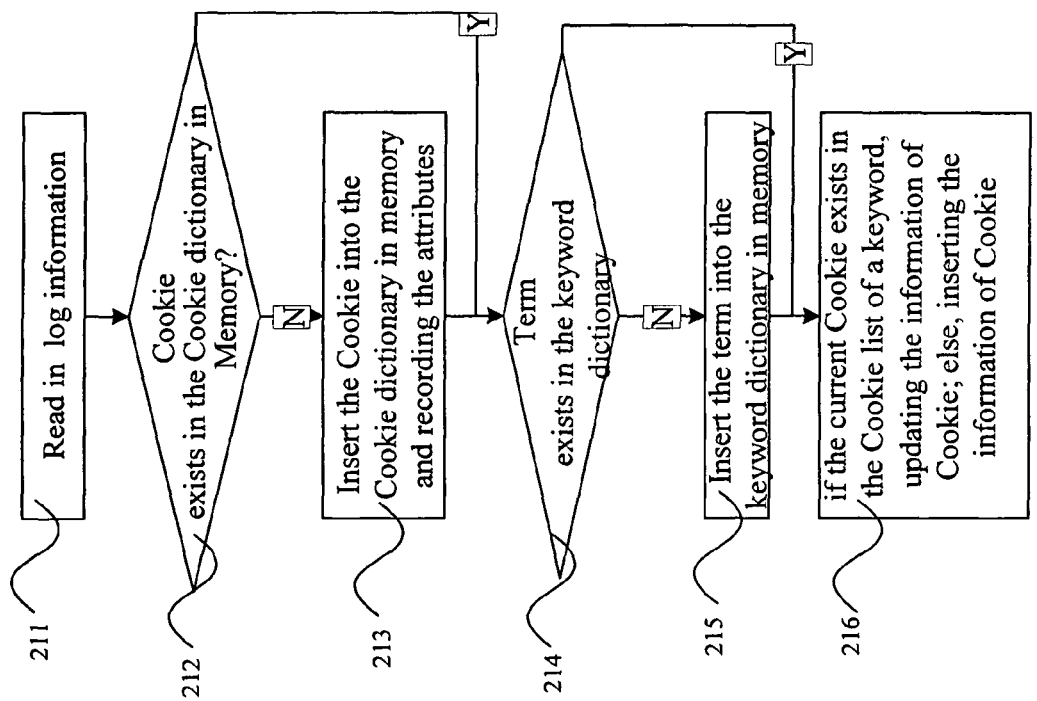
FIG. 15 is a flowchart of an exemplary process for generating keyword-Cookie index data for retrieving advertisement information according to another embodiment of the present teaching.

FIG. 15 is a flowchart of an exemplary process for generating keyword-Cookie index data for retrieving advertisement information according to another embodiment of the present teaching. Log information is first read on at step 211. The received log information is processed to extract relevant information. For example, Cookies and associated attributes may be extracted from the log information. Different words, e.g., keywords used in queries, may also be segmented and separately stored for future use. Once a Cookie is extracted from the log information, it is determined; at step 212, whether the Cookie exists in a Cookie dictionary in memory. If the Cookie does not exist in the Cookie dictionary, it is inserted, at step 213, into the Cookie dictionary together with attributes associated with the Cookie. It it further determined whether the extracted terms or keywords exist in a keyword dictionary. If the keywords extracted from the log information can not be found in the keyword dictionary, determined at step 214, such keywords are inserted, at step 215, into the keyword dictionary. The keywords segmented from the log information are then processed, e.g., one at a time at step 216.

To create keyword-Cookie indices, for each keyword, there is an associated Cookie list, containing Cookies that are associated with a query using the keyword. In processing each keyword, the log analysis system may examine, with respect to each Cookie, to see if a query associated with this Cookie includes the keyword. For each such identified Cookie, it is further determined whether the identified Cookie exists in the Cookie list associated with the keyword. If not, the Cookie is added to the Cookie list. In this manner, each keyword has a Cookie list, constituting keyword-Cookie index data.

Each keyword may be assigned with some attributes. For example, in order to measure the relevancy between a Cookie and a keyword or between a Cookie and an advertisement, the keyword may be assigned a weight in accordance with some predetermined criteria. In determining the value of the weight assigned to a particular keyword, keyword frequency in the context of an advertisement database may be considered. Such consideration may contribute to the initial weight. However, such assigned initial weights may be updated or evolved over time based on other considerations.

Similarly, information about each Cookie may also be updated over time based on a variety of reasons. For example, various types of information associated with a Cookie may be all recorded with the Cookie in a Cookie list. This may include a weight assigned to the Cookie. Different types of information contained in the log may be used to update the record of a Cookie. For example, information recorded relating to the period(s) of time during which a Cookie is active may be used to update the weight associated with the Cookie.

Figure 16:
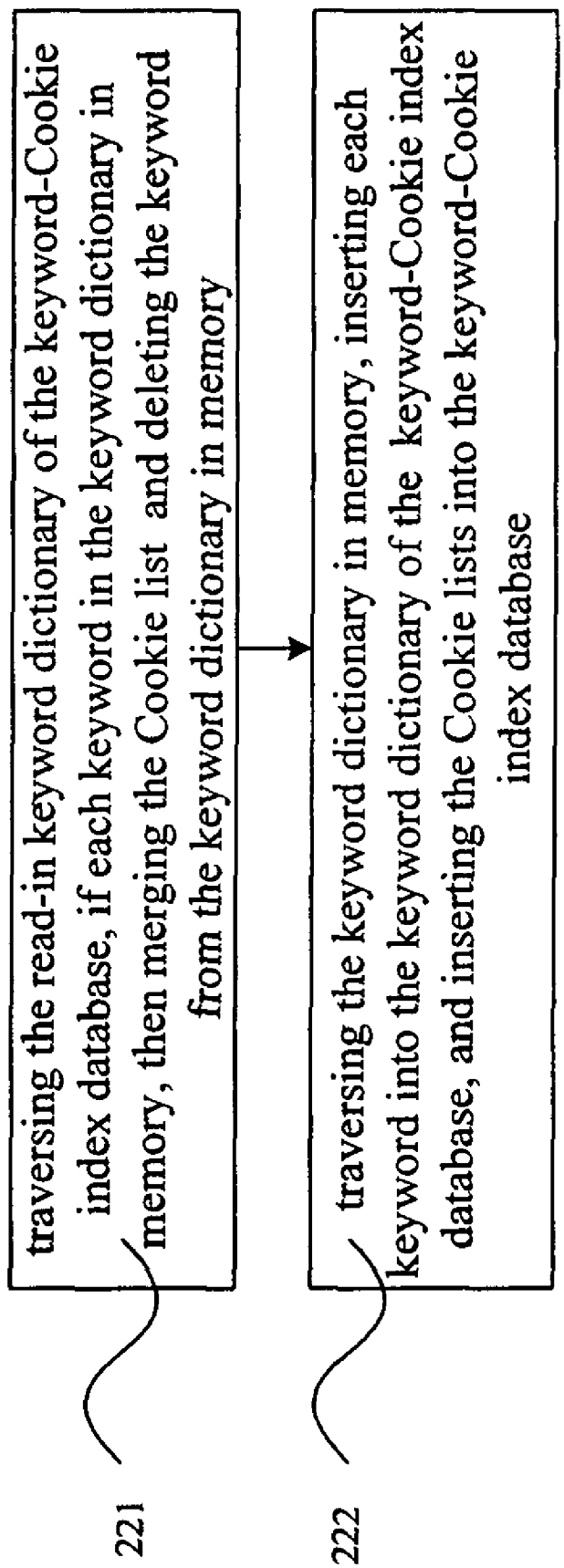
FIG. 16 is a flowchart of an exemplary process for merging an increment of keyword-Cookie index data with the increment of keyword-Cookie index data in a database according to another embodiment of the present teaching.

The keyword-Cookie index generation module may also be configured for merging an increment of the keyword-Cookie index data, e.g., temporarily stored in the memory, with the recorded increment of keyword-Cookie index data stored in the keyword-Cookie index database. FIG. 16 is a flowchart of an exemplary process for merging an increment of keyword-Cookie index data with the increment of keyword-Cookie index data in a database according to another embodiment of the present teaching. Assume that the increment of the keyword-Cookie index data in the memory is stored with a keyword dictionary corresponding to the increment in the memory. There is a different keyword dictionary in a database corresponding to the increment of the keyword-Cookie index data stored in the same database. At step 221, the keyword-Cookie index generation module traverses the keywords that exist in both keyword dictionaries and merges the corresponding keywords in both memory and the keyword-Cookie index database, and store the merged result in the keyword-Cookie index database. Such keywords that have been merged are then deleted from the keyword dictionary in the memory. At step 222, the keyword-Cookie index generation module traverses each keyword that remains in the keyword dictionary and adds the keyword to the keyword-Cookie index database.

While this is a level of merge from an increment stored in the internal memory to the increment stored in the database, another level of merge, namely the merge between the increment and the history database, may also be carried out according to some schedule. For example, the second level of merge may be performed whenever the size of the increment of keyword-Cookie index reaches a predetermined level. The merge operation may also be scheduled at some predetermined time intervals.

Figure 17:
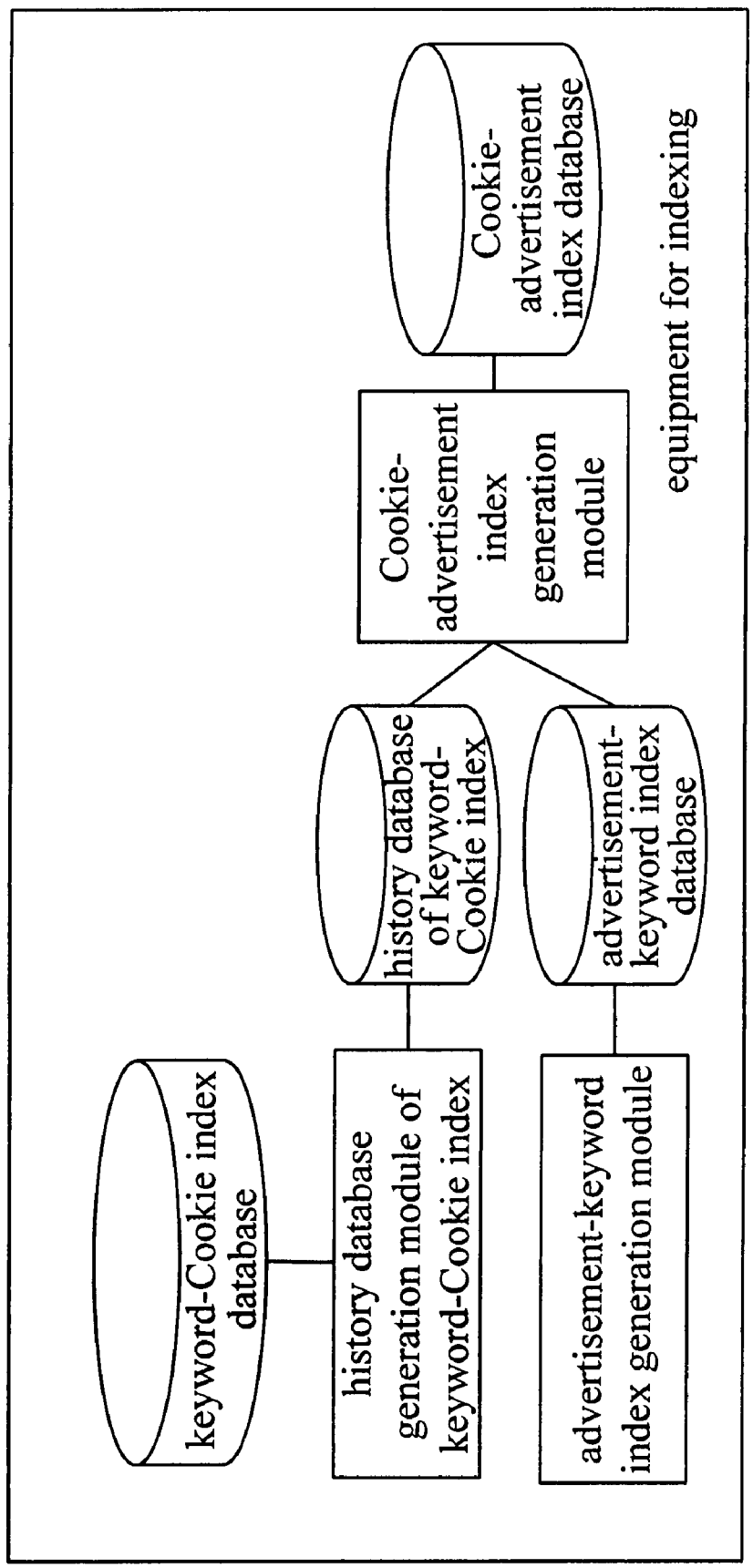
FIG. 17 is a block diagram of an indexing system according to another embodiment of the present teaching.

FIG. 17 is a block diagram of an indexing system according to another embodiment of the present teaching. The exemplary indexing system, as illustrated in FIG. 17, comprises an advertisement-keyword index database, an advertisement-keyword index generation module, a history database of keyword-Cookie index, a history database generation module of keyword-Cookie index, a Cookie-advertisement index database and a Cookie-advertisement index generation module. The advertisement-keyword index database is configured for storing advertisement-keyword index data. The advertisement-keyword index generation module is coupled to the advertisement-keyword index database for obtaining advertisement-keyword index data and storing them into the advertisement-keyword index database. The history database of keyword-Cookie index is provided for storing the history data of keyword-Cookie index. The history database generation module of keyword-Cookie index is coupled to the keyword-Cookie index database and history database of keyword-Cookie index for carrying out a merge operation to combine an increment of keyword-Cookie index data into the history database of keyword-Cookie index. The Cookie-advertisement index database is provided for storing Cookie-advertisement index data. The Cookie-advertisement index generation module is coupled to the advertisement-keyword index database and the keyword-Cookie index database for obtaining Cookie-advertisement index data and storing them into the Cookie-advertisement index database.

Figure 18:
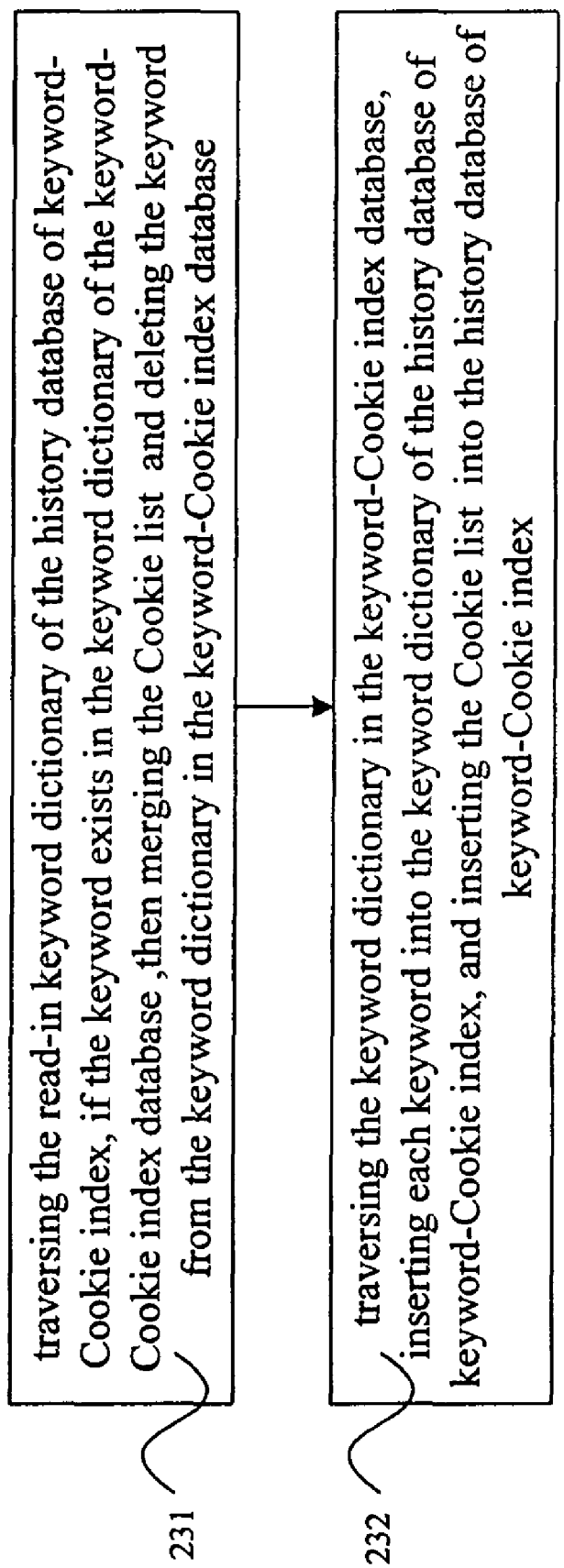
FIG. 18 is a flowchart of an exemplary process for merging an increment of keyword-Cookie index data with the corresponding keyword-Cookie index in a history database according to another embodiment of the present teaching.

FIG. 18 is a flowchart of an exemplary process for merging an increment of keyword-Cookie index data with the corresponding keyword-Cookie index in a history database according to another embodiment of the present teaching. At step 231, a keyword dictionary stored in the history database of keyword-Cookie index is retrieved. For each keyword contained in the retrieved keyword dictionary, a search in the keyword dictionary of the keyword-Cookie index database is performed. If a match is found (i.e., the keyword exists in both dictionaries), the Cookie list of the keyword in the keyword-Cookie index database is merged with the Cookie list of the corresponding keyword in the history database of keyword-Cookie index. The keyword that has been merged may be subsequently deleted from the keyword dictionary from the keyword-Cookie index database. As discussed herein, weights stored in a history database may be modified based on the weights from the corresponding keywords in the increment. To reflect the time periods versus activities, the weights in the history database may be multiplied by some attenuation factor to introduce a decay effect. In addition, as discussed herein, during a merge operation, if the weight of a Cookie in the Cookie list of keyword is below some threshold, or the Cookie has expired according to some criteria, both a keyword and a Cookie may be removed or purged from the history database. For instance, if the last time period during which Cookie is recorded to be active is sufficiently far from current time (e.g., a preset number of months ago), it may be reasonable to infer that the Cookie no longer exists and, therefore, can be purged.

At step 232, each of the keywords that do not yet exist in the history database is inserted into the keyword dictionary of the history database of keyword-Cookie index. In addition, the Cookie list of each such keyword is inserted into the history database of keyword-Cookie index.

In some embodiments, a scheme of two-way merge operation may be employed to merge Cookies. Assuming there are two dictionaries involved in a merge operation, one is labeled "A" and the other is labeled "B". During the merge operation, a switch may be employed and in operation the status of the switch (e.g., 0 or 1 or ON or OFF) indicates that either dictionary "A" or dictionary "B" is currently being merged. For example, after the index database corresponding to dictionary "A" has been merged, the new index database obtained is outputted to dictionary "B". Conversely, after the index database corresponding to dictionary "B" has been merged, the new index database obtained is outputted to dictionary "A". Using such a switch, the merge operation can be continuously carried out.

Figure 19:
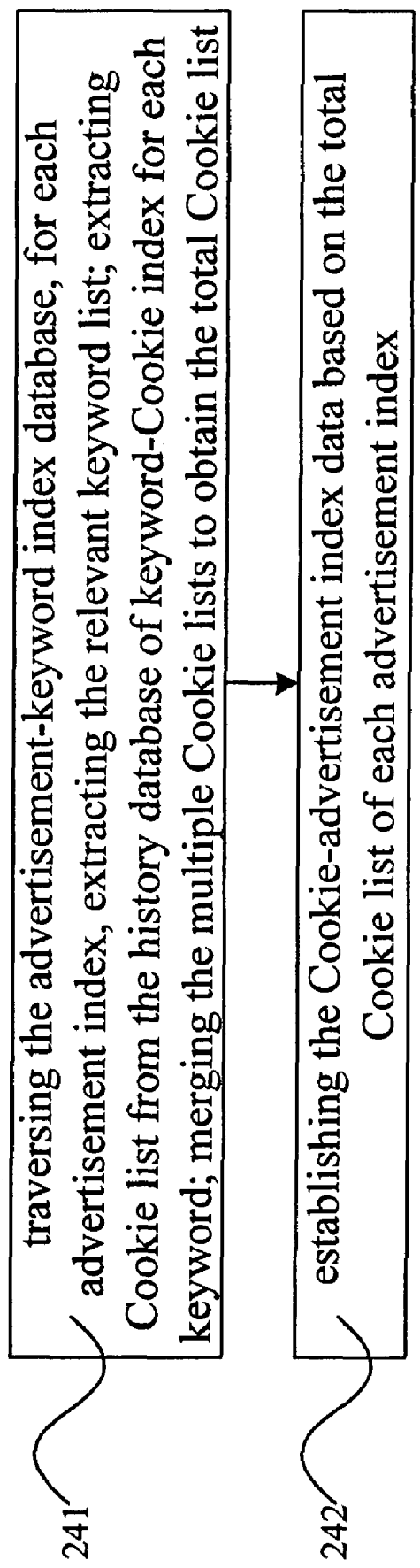
FIG. 19 is a flowchart of an exemplary process for generating Cookie-advertisement index data in accordance with keyword-Cookie index data and advertisement-keyword index data according to a different embodiment of the present teaching.

The Cookie-advertisement index may be established based on previously established keyword-Cookie index data and advertisement-keyword index data. FIG. 19 is a flowchart of an exemplary process for obtaining Cookie-advertisement index data in accordance with keyword-Cookie index data and advertisement-keyword index data according to a different embodiment of the present teaching. At step 241, to create the Cookie-advertisement indices, a complete Cookie list for each advertisement is first created. This is performed by tracing each advertisement-keyword index to retrieve a keyword list. Then based on each keyword in the keyword list for the advertisement, a Cookie list is derived by tracing the keyword-Cookie index for each keyword in the keyword list. Such obtained Cookie lists are then merged to generate a complete Cookie list with respect to the advertisement. At step 242, based on the complete Cookie list, the Cookie-advertisement index can be accordingly generated. A complete Cookie list may be similarly obtained for each advertisement present in the advertisement-keyword index data.

Figure 20:
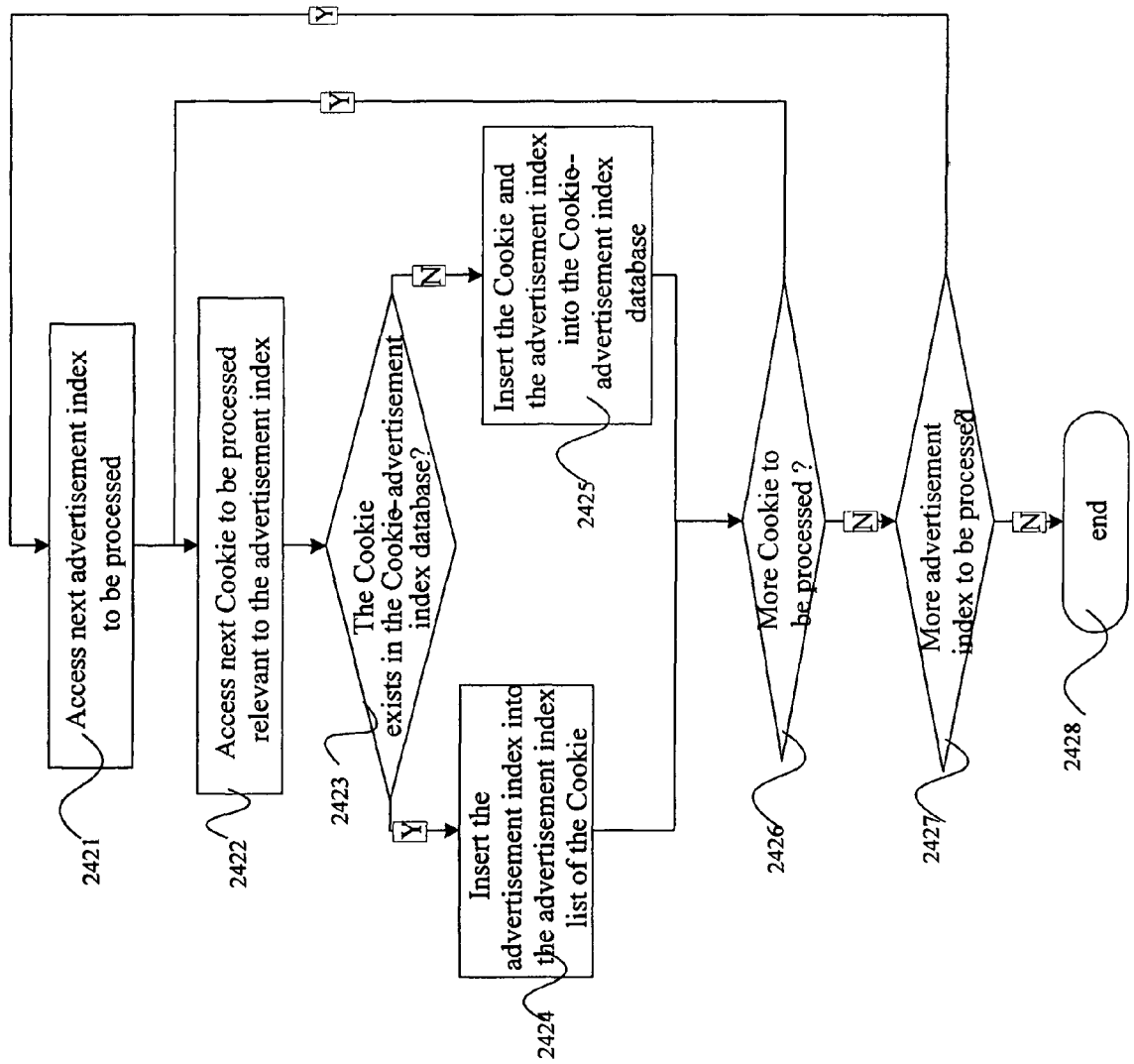
FIG. 20 is a flowchart of an exemplary process for generating Cookie-advertisement index data based on a Cookie list associated with an advertisement index according to another different embodiment of the present teaching.

FIG. 20 is a flowchart of an exemplary process for generating Cookie-advertisement index data based on a Cookie list associated with each advertisement index according to another different embodiment of the present teaching. In this illustrated process, an advertisement index to be processed next is identified first at step 2421. A Cookie list associated with the advertisement index to be processed is accessed. The Cookie list is traversed so that each Cookie included in the Cookie list can be individually processed. At step 2422, a Cookie to be processed next is identified. If the Cookie being processed does not exist in the Cookie-advertisement index database, determined at step 2423, the Cookie as well as the associated advertisement are added, at step 2425, to the Cookie-advertisement index database. In this case, the advertisement becomes the first advertisement of an advertisement list associated with the Cookie being processed. If the Cookie being processed already exists in the Cookie-advertisement index database, determined at step 2423, the advertisement index is merged, at step 2424, with the existing advertisement index list corresponding to the Cookie. During the merge (not shown), the advertisement is added to the existing advertisement list for the Cookie when the advertisement does not yet exist therein. This process continues until, determined at both steps 2426 and 2427, each and every Cookie in a Cookie list associated with each and every advertisement index has been processed.

Whenever a new or updated history database of keyword-Cookie index or a new advertisement-keyword index data is generated, the Cookie-advertisement index data may need to be updated as well. An update due to a change in the history data of keyword-Cookie index may be performed by following similar steps as illustrated in steps 2421-2428 or using any other process known in the art that achieves the needed update. If an update is due to a change in the advertisement-keyword index data, e.g., an advertisement is newly introduced or removed due to expiration under some contractual terms, a corresponding update to the Cookie-advertisement may be achieved in different ways. For example, it may be achieved based on the inverse index or the advertisement-Cookie index data. An update to the advertisement-Cookie index may be carried out first based on the updated advertisement information. Then, based on the updated advertisement-Cookie index, the Cookie-advertisement index may also be accordingly updated. Alternatively, the update to the Coolie-advertisement index may also be performed based on updated advertisement-keyword index data and updated keyword-Cookie index data. In situations where an update is needed due to a change in some advertisement information, it may be more efficient to update the Cookie-advertisement index data based on the stored advertisement-Cookie index data or a complete Cookie list of each advertisement index. In this case, whenever there is a change in a particular advertisement (added, removed, updated), the complete Cookie list corresponding to the updated advertisement can be accordingly modified. Then the modification to the Cookie-advertisement index data may be determined based on the modification made to the complete Cookie list for the advertisement.

Figure 21:
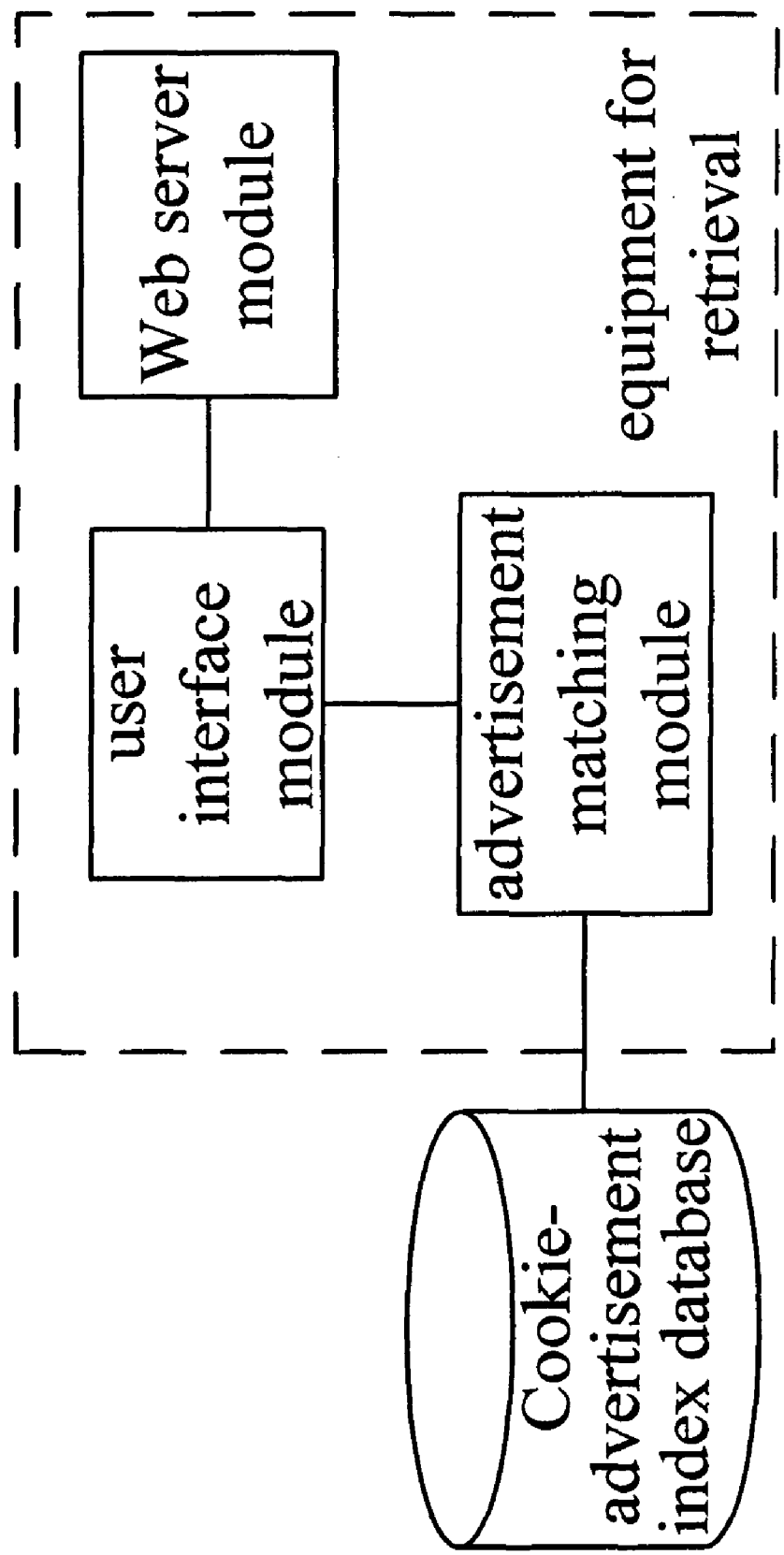
FIG. 21 is a block diagram of an advertisement information retrieval system according to a different embodiment of the present teaching.

FIG. 21 depicts a block diagram of an advertisement information retrieval system according to a different embodiment of the present teaching. The advertisement information retrieval system, as illustrated in FIG. 21, comprises a Web server module, a user interface module and an advertisement matching module. The Web server module is configure for communicating with the Internet. The user interface module is coupled to the Web server module for receiving a search request and for generating advertisement pages as a response to the search request. The advertisement matching module is coupled to the keyword-advertisement index database for searching the Cookie-advertisement index database based on a Cookie identified from the received search request, identifying advertisement(s) that are considered to be suitable to the Cookie, and sending them to the user interface module.

Figure 22:
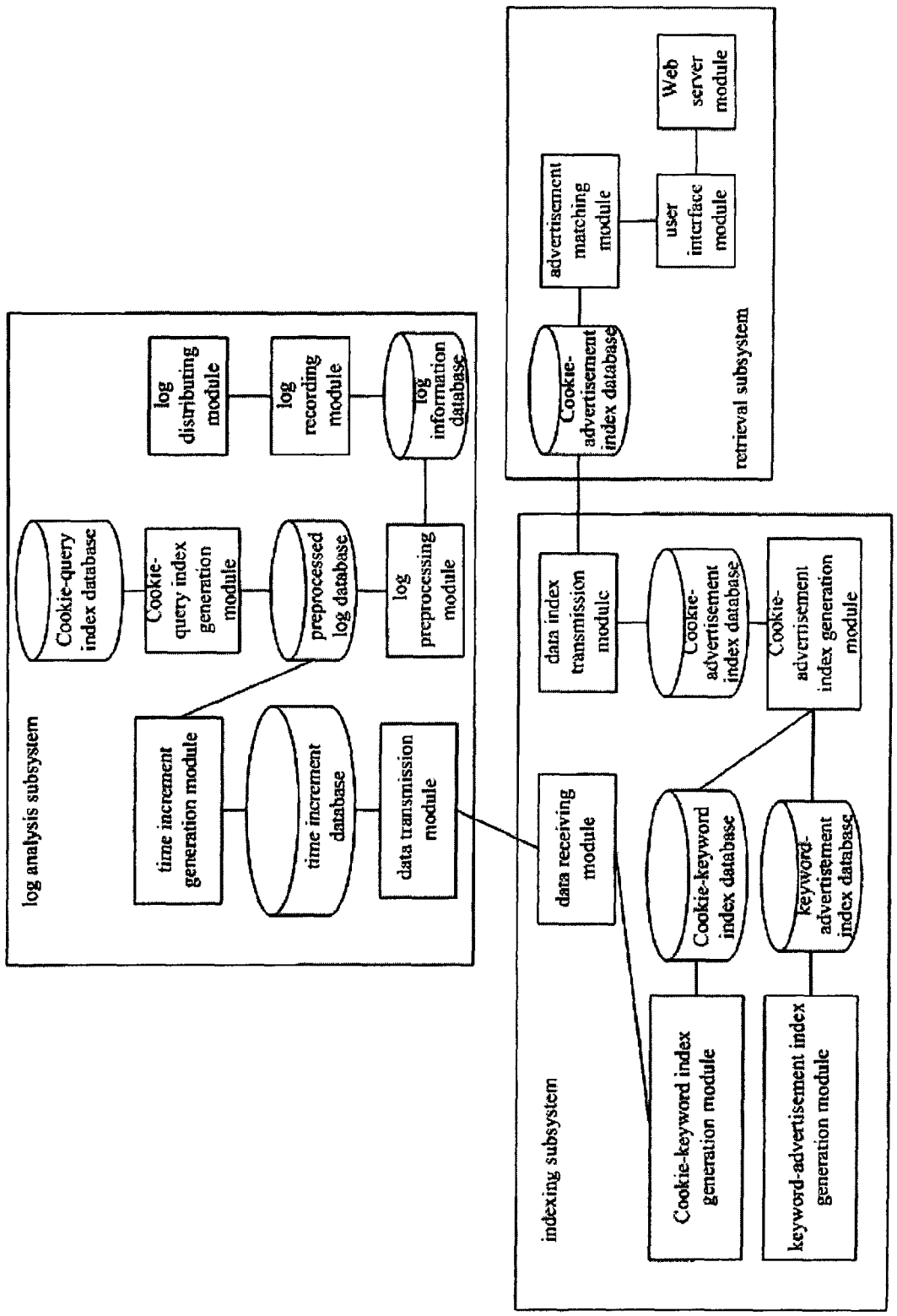
FIG. 22 is a block diagram of an advertisement information retrieval system according to yet another different embodiment of the present teaching.

FIG. 22 depicts a block diagram of an advertisement information retrieval system according to yet another different embodiment of the present teaching. The log analysis system in this illustrated embodiment further includes a data transmission module configured for transmitting an increment of keyword-Cookie index data to the retrieval system, a Cookie-query index database for storing Cookie-query index data, and a Cookie-query index generation module. The Cookie-query index generation module is coupled to the preprocessed log database and the Cookie-query index database for generating Cookie-query index data and storing them in the cookie-query index database.

The retrieval system as illustrated in FIG. 22 additionally includes a data receiving module for communicating with the data transmission module in the log analysis system as well as a data index transmission module for transmitting the Cookie-advertisement index data to the retrieval system. The retrieval system as illustrated in FIG. 22 further includes a Cookie-advertisement index database for storing Cookie-advertisement index data, which is maintained so that its content is coherent or consistent with the Cookie-advertisement index database in the indexing system. In this illustrated embodiment, since the retrieval system locally stores the Cookie-advertisement index data, the retrieval operation can therefore be performed locally (rather than remotely from the indexing system via network), not only the network traffic may be significant reduced, the speed performance in retrieving suitable advertisement(s) can also be improved.

While the inventions have been described with reference to the certain illustrated embodiments, the words that have been used herein are words of description, rather than words of limitation. Changes may be made, within the purview of the appended claims, without departing from the scope and spirit of the invention in its aspects. Although the inventions have been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

What is claimed is:

1. A system, residing on a computer system that is connected to the Internet and has a processor, a storage, and communication platform, for retrieving advertisement information with respect to an Internet search request, comprising:

a log system, operative via the processor of the computer system, configured for processing a log recording users' visits in a first database accessible to the computer system;

an indexing system, operative via the processor of the computer system, configured for obtaining index data, in a second database accessible from the computer system where the indexing system resides, based on the log or processing result thereof; and a retrieval system, operative via the processor of the computer system, configured for identifying one or more advertisements, from a third database storing advertisements, with respect to a search request received from a user, wherein the index data related to the user are established based on the user's past visits, and the one or more advertisements are identified based on the index data related to the user so that the one or more advertisements are selected to match the user's past search behavior characterized at least partially by the log.

2. The system of claim 1, wherein the index data include a first type of index and a second type of index.

3. The system of claim 2, wherein the first type of index associates a user with one or more keywords used in at least one past query initiated by the user.

4. The system of claim 2, wherein the second type of index associates a keyword with one or more advertisements.

5. The system of claim 2, wherein at least one of first type of index and the second type of index can be evaluated based on a measure associated with a keyword in connection with the index to be evaluated.

6. The system of claim 5, wherein the measure is a weight.

7. The system of claim 1, wherein the log system comprises:
a log storage configured for storing the log;
a log processing module configured for analyzing the log to generate processed log information, wherein the processed log information includes at least a user identifier and one or more queries associated therewith.

8. The system of claim 7, wherein the log system further comprises:
an index generation module configured for generating additional index data associating a user identifier with at least one query initiated by the user; and
an index storage configured for storing the additional index data.

9. The system of claim 8, wherein the log system further comprises:
a time increment generation module configured for generating a time increment of at least a portion of the index data based on the processed log information; and
a time increment storage for storing the time increment.

10. The system of claim 9, wherein the index generation module generates an increment of the portion of the index data based on the time increment.

11. The system of claim 1, wherein the indexing system comprises:
a first index generation module configured for generating an increment of a first type of index;
a first index storage for storing the increment of the first type of index;
a second index generation module configured for generating a second type of index; and
a second index storage for storing the second type of index.

12. The system of claim 1, wherein the retrieval system comprises:
a first index storage configured for storing history data of a first type of index; and
an advertisement matching module configured for selecting the one or more advertisements with respect to the user given the search request that match the user's past search behavior based on information stored in the first index storage.

13. The system of claim 12, further comprising a history data generation module configured for generating the history data of the first type of index, wherein the history data generation module updates the history data of the first type of index by merging an increment of the first type of index with the history data of the first type of index.

14. The system of claim 13, wherein the advertisement matching module selects the one or more advertisements by further basing on the increment of the first type of index.

15. The system of claim 12, further comprising:
a second index storage configured for storing a second type of index, wherein the advertisement matching module selects the one or more advertisements based on information stored in the first index database and the second index database.

16. The system of claim 1, wherein at least one of the log system, the indexing system, and the retrieval system is distributed.

17. The system of claim 16, wherein each of the distributed system is configured geographically distributed or logically distributed.

18. The system of claim 16, wherein each of the distributed system performs an operation with respect to a search request distributed thereto in accordance with an identifier of the user contained in the search request.

19. A computer-implemented method, residing on a computer system that is connected to the Internet and has a processor, a storage, and communication platform, for retrieving advertisement information with respect to an Internet search request, comprising the steps of:
obtaining, by a log system that is operative via the processor and via the communication platform of the computer system, a log recording users' visits;
obtaining, from a first database, index data generated, by an index system that is operative via the processor, based on the log or processing result thereof; and
identifying, by a retrieval system that is operative via the processor, one or more advertisements, from a second database storing advertisements, with respect to a search request received from a user based on the index data, wherein the one or more advertisements are selected to match the user's past search behavior characterized at least partially by the log.

20. The method of claim 19, wherein the index data include a first type of index and a second type of index.

21. The method of claim 20, wherein the first type of index associates a user with one or more keywords that the user used in at least one past query.

22. The method of claim 21, wherein the second type of index associates a keyword with one or more advertisements.

23. The method of claim 22, wherein at least one of first type of index and the second type of index can be evaluated based on a measure associated with a keyword in connection with the index to be evaluated.

24. The method of claim 23, wherein
a measure evaluating a first type of index corresponding to a user is derived based on a weight associated with a keyword used in at least one past query from the user; or
a measure evaluating a second type of index is derived based on a weight associated with a keyword deemed to characterize an advertisement.

25. The method of claim 22, wherein the step of identifying comprises:
searching the first type of index based on an identifier of a user associated with the search request to obtain a corresponding keyword list;
searching the second type of index based on the keyword list to obtain the one or more advertisements.

26. The method of claim 20, wherein the first type of index is generated by:
generating an increment of the first type of index based on the log or the processing result thereof;
merging the increment of the first type of index with history data of the first type of index to produce an updated history data of the first type of index.

27. The method of claim 26, wherein the step of searching the first type of index comprises;
locating one or more instances of the first type of index containing the identifier of the user;

obtaining a keyword list from each of the instances;

forming the corresponding keyword list based on the keyword list from each of the instances, wherein the one or more instances are identified based on one of the updated history data and a combination of the history data and the increment of the first type of index.

28. The method of claim 26, wherein the merging comprises:

multiplying a weight of each keyword in the history data by an attenuation factor to produce an attenuated weight for each keyword in the history data;

for each first user identifier of each first type of index in the increment having a corresponding user identifier in the history data, merging each first keyword list of the first user identifier in the increment with each corresponding keyword list of the corresponding user identifier in the history data to form a non-overlap keyword list of the first user identifier in the updated history data;

for each second user identifier of each first type of index in the increment that has no corresponding user identifier in the history data, inserting the second user identifier and a second keyword list of the second user identifier to create a new instance of the first type of index in the updated history data.

29. The method of claim 28, wherein the step of merging each keyword list comprises:

generating a merged weight for a first keyword in the non-overlap keyword list, which comes from both the first keyword list and the corresponding keyword list, by adding a first weight of the first keyword in the first keyword list in the increment and a corresponding attenuated weight of the first keyword in the corresponding keyword list in the history data;

generating a merged weight for a second keyword in the non-overlap keyword list, which comes from one of the first keyword list and the corresponding keyword list, by inserting the second keyword and a weight associated with the second keyword.

30. The method of claim 29, wherein the step of inserting the second user identifier and a second keyword list further comprises inserting one or more weights corresponding to one or more keywords included in the second keyword list of the second user identifier.

31. The method of claim 30, further comprising removing a keyword from the non-overlap keyword list when the corresponding merged weight is less than a preset threshold.

32. The method of claim 31, further comprising removing an instance of the first type of index corresponding to a user identifier when a corresponding keyword list associated with the user identifier has a fewer keyword than a first predetermined threshold; or has all keywords having respective weights less than a second predetermined threshold.

33. A system, residing on a computer system that is connected to the Internet and has a processor, a storage, and communication platform, for retrieving advertisement information with respect to an Internet search request, comprising:

a log system, operative via the processor of the computer system, configured for obtaining a log recording users' visits in a first database accessible to the computer system;

an indexing system, operative via the processor of the computer system, configured for obtaining a first type of index associating individual users with advertisements established based on index data created in a second database accessible to the computer system in accordance with the log or processing result thereof; and a retrieval system, operative via the processor of the computer system, configured for identifying one or more advertisements, from a third database storing advertisements, with respect to a search request received from a user based on the first type of index, wherein the one or more advertisements are selected to match with the user's past search behavior characterized by the log and the index data.

34. The system of claim 33, wherein the index data comprises a second type of index and a third type of index.

35. The system of claim 34, wherein:

the second type of index associates a keyword with one or more users who used the keyword in at least one past query;

the third type of index associates an advertisement with one or more keywords that to characterize the advertisement.

36. The system of claim 34, wherein at least one of the second type of index and the third type of index can be evaluated based on a measure associated with a keyword in connection with the index to be evaluated.

37. The system of claim 36, wherein the measure is a weight.

38. The system of claim 34, wherein the log system is further capable of obtaining a fourth type of index associating a user with one or more queries initiated by the user based on the log or the processing result thereof.

39. The system of claim 34, wherein the log system is further capable of obtaining an increment of the second type of index based on the log or processing result thereof; and the increment of the second type of index is merged with existing second type of index to produce an updated second type of index.

40. The system of claim 34, wherein the indexing system comprises:

a first index generation module configured for generating the first type of index;

a first index storage for storing the generated first type of index;

a second index generation module configured for generating the second type of index;

a second index storage for storing the generated second type of index;

a third index generation module configured for generating the third type of index; and a third index storage for storing the generated third type of index.

41. The system of claim 33, wherein the retrieval system comprises:

an interface module configured for receiving the search request from the user, initiating a search for advertisements in connection with the search request, and responding the search request by providing the one or more advertisements; and an advertisement matching module configured for searching the first type of index based on an identifier of the user, determining the one or more advertisements based on the search result;

providing the one or more advertisements to the interface module.

42. The system of claim 33, wherein at least one of the log system, the indexing system, and the retrieval system is distributed.

43. The system of claim 42, wherein each distributed system performs an operation with respect to a search request distributed thereto in accordance with information associated with the search request.

44. A computer-implemented method, operative on a computer system connected to the Internet and having a processor, a storage, and communication platform, for retrieving advertisement information with respect to an Internet search request, comprising:

receiving, from the Internet via the communication platform, a search request from a user; and identifying, by a retrieval system implemented in the computer system and operative via the processor, one or more advertisements with respect to the user based on a first type of index associating individual users with advertisements, wherein the first type of index is created, by an index system implemented in the computer system and operative via the processor, based on information characterizing the user's past search behavior derived from a log of users' visits generated by a log system implemented in the computer system and operative via the processor, and the one or more advertisements are selected to match the user's past search behavior.

45. The method of claim 44, wherein the information characterizing the user's past search behavior includes a second type of index associating each keyword with one or more users who utilized the keyword in at least one past query.

46. The method of claim 44, wherein the first type of index is created further based on information characterizing advertisements, which includes a third type of index associating each advertisement with one or more keywords characterizing the advertisement.

47. A system, residing on a computer system that is connected to the Internet and has a processor, a storage, and communication platform, for retrieving advertisement information with respect to an Internet search request, comprising:

a retrieval system, operative via the processor of the computer system, configured for identifying one or more advertisements with respect to a search request received from a user based on a first type of index associating individual users with advertisements, wherein the first type of index is created via an indexing system based on information characterizing the user's past search behavior derived from a log recording users' visits, and the one or more advertisements are selected to match the user's past search behavior.

48. A system, residing on a computer system that is connected to the Internet and has a processor, a storage, and communication platform, for distributing advertisement information to one or more users, comprising:

an advertisement distributing system, operative via the processor of the computer system, configured for identifying one or more users with respect to an advertisement based on a first type of index associating advertisements with individual users, wherein the first type of index is created via an indexing system based on information characterizing users' past search behavior derived from a log recording users' visits, and the one or more users are selected so that the advertisement matches the user's past search behavior.

49. The system of claim 48, wherein the information characterizing users' past search behavior includes a second type of index associating each user with one or more keywords that are utilized in at least one past query initiated by the user; and the second type of index is obtained based on the log recording users' visits.

50. The method of claim 49, wherein the first type of index is created further based on information characterizing advertisements, including a third type of index associating each keyword with one or more advertisements where the keyword is considered relevant to the one or more advertisements.

51. A computer-implemented method, operative on a computer system that is connected to the Internet and having a processor, a storage, and communication platform, for distributing advertisement information, comprising the steps of:

identifying, by a retrieval system implemented in the computer system and operative via the processor, one or more users with respect to an advertisement based on a first type of index associating advertisements with individual users, wherein the first type of index is created, by an index system implemented in the computer system and operative via the processor, based on information characterizing users' past search behavior derived from a log of users' visits which is generated by a log system implemented in the computer system and operative via the processor, and the one or more users are selected so that the advertisement matches the user's past search behavior.

52. The method of claim 51, wherein the information characterizing users' past search behavior includes a second type of index associating each user with one or more keywords used in at least one past query initiated by the user and obtained based on the log recording users' visits; and the first type of index is created further based on information characterizing advertisements, including a third type of index associating each keyword with one or more advertisements where the keyword is considered relevant to the one or more advertisements.

53. A machine readable medium having information recorded thereon, the information, when read by the machine, enables the machine to perform the following:

receiving, from the Internet via a communication platform of the machine, a search request from a user; and identifying, by executing instructions of a retrieval system programmed to be operative via a processor of the machine, one or more advertisements with respect to the user based on a first type of index associating individual users with advertisements, wherein the first type of index is created, by executing instructions of an index system programmed to be operative via the processor of the machine, based on information characterizing the user's past search behavior via a log recording users' visits generated via instructions of a log system programmed to be operative via a processor of the machine, and the one or more advertisements are selected to match the user's past search behavior.

54. A machine readable medium having information recorded thereon, the information, when read by the machine, enables the machine to perform the following:

obtaining index data, created by executing instructions of an index system programmed to be operative via a processor of the machine, based on a log recording users' visits or processing result thereof generated via instructions of a log system programmed to be operative via the processor of the machine; and identifying, by executing instructions of a retrieval system programmed to be operative via the processor of the machine, one or more advertisements with respect to a search request received from a user based on the index data, wherein the index data are derived based on the log and indicative of the user's past search behavior, and the one or more advertisements are identified to match the user's past search behavior.

55. A machine readable medium having information recorded thereon, the information, when read by the machine, enables the machine to perform the following:

obtaining, by executing instructions of a log system programmed to be operative via a processor of the machine, a log recording users' visits;

obtaining, by executing instructions of an index system programmed to be operative via the processor of the machine, index data based on a log recording users' visits or processing result thereof generated by the log system; and identifying, by executing instructions of a retrieval system programmed to be operative via the processor of the machine, one or more advertisements with respect to a search request received from a user based on the index data, wherein the index data are derived based on the log and indicative of the user's past search behavior, and the one or more advertisements are identified to match the user's past search behavior.

56. A machine readable medium having information recorded thereon, the information, when read by the machine, enables the machine to perform the following:

identifying, by executing instructions of a retrieval system programmed to be operative via a processor of the machine, one or more users with respect to an advertisement based on a first type of index associating advertisements with individual users, wherein the first type of index is created, by executing instructions of an index system programmed to be operative via the processor of the machine, based on information characterizing users' past search behavior via a log recording users' visits generated by executing instructions of a log system programmed to be operative via the processor of the machine, and the one or more users are selected so that the advertisement matches the user's past search behavior.

* * * * *